(12) United States Patent
Kanaoka et al.

(10) Patent No.: US 11,562,317 B2
(45) Date of Patent: Jan. 24, 2023

(54) INFORMATION SYSTEM, INFORMATION PROCESSING METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Kei Kanaoka, Nagoya (JP); Shun Maeda, Nisshin (JP); Yoshihiro Murozaki, Nisshin (JP); Hiroko Tsujimura, Nagoya (JP); Daiki Kaneichi, Nisshin (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 16/224,984

(22) Filed: Dec. 19, 2018

(65) Prior Publication Data
US 2019/0205831 A1    Jul. 4, 2019

(30) Foreign Application Priority Data
Dec. 28, 2017   (JP) ............................ JP2017-253847

(51) Int. Cl.
*G06Q 10/08*   (2012.01)
*H04W 4/021*   (2018.01)
*G06Q 50/30*   (2012.01)

(52) U.S. Cl.
CPC ..... *G06Q 10/0835* (2013.01); *G06Q 10/0832* (2013.01); *G06Q 50/30* (2013.01); *H04W 4/021* (2013.01)

(58) Field of Classification Search
CPC .. G06Q 10/02; G06Q 10/083; G06Q 10/0835; G06Q 50/30; G06Q 30/0645;
(Continued)

(56) References Cited

U.S. PATENT DOCUMENTS 9,508,259 B2 * 11/2016 Kim ..................... G08G 1/143
9,908,426 B2 * 3/2018 Fukushima ............. B60L 53/38
(Continued)

FOREIGN PATENT DOCUMENTS

DE   10 2015 209 482 A1   11/2016
JP       2006026225 A  *  2/2006
(Continued)

OTHER PUBLICATIONS

"Cardrops is a Service That Puts Stuff You Order Into the Trunk of Your Car. Yeah. Really," by John Biggs, Oct. 29, 2012 (Year: 2012).*
(Continued)

*Primary Examiner* — Omar Zeroual
*Assistant Examiner* — Brian Adams Heflin
(74) *Attorney, Agent, or Firm* — Oblon, McClelland, Maier & Neustadt, L.L.P.

(57) ABSTRACT

An information system manages use of one or more areas in a vehicle permitted to be used as a pick-up and delivery destination of a pick-up and delivery product. The information system includes an information processing device. The information processing device acquires state information including at least one of information on a parking state of the vehicle and information on a surroundings situation of a parking position of the vehicle, and provides determination information for assisting in a determination as to whether or not pick-up and delivery of the pick-up and delivery product to the one or more areas is possible based on the state information, to an external device that is provided external to the information processing device.

14 Claims, 18 Drawing Sheets

(58) Field of Classification Search
CPC .............. G06Q 10/0832; H04W 4/021; G07C 9/00571; G07C 9/00896
See application file for complete search history.

(56) References Cited

U.S. PATENT DOCUMENTS

| | | | |
|---|---|---|---|
| 10,246,054 B2* | 4/2019 | Rous | B60R 25/01 |
| 2005/0242618 A1* | 11/2005 | Menard | B60Q 1/324 |
| | | | 296/146.4 |
| 2015/0310532 A1* | 10/2015 | Gura | G06Q 50/30 |
| | | | 705/7.13 |
| 2016/0189098 A1* | 6/2016 | Beaurepaire | H04W 12/0804 |
| | | | 705/337 |
| 2017/0017502 A1* | 1/2017 | Gross | G06Q 10/08 |
| 2017/0017920 A1* | 1/2017 | Stark | B60R 25/24 |
| 2017/0018181 A1* | 1/2017 | Davidsson | G06Q 10/0835 |
| 2017/0024688 A1* | 1/2017 | Wiechers | G06Q 10/083 |
| 2018/0240067 A1* | 8/2018 | Oz | G06F 16/951 |

FOREIGN PATENT DOCUMENTS

| | | | |
|---|---|---|---|
| JP | 2006-206225 | | 8/2006 |
| JP | 2013117780 A | * | 6/2013 |

OTHER PUBLICATIONS

"What Amazon's in-car delivery service means for your vehicle's future: Your trunk just became your mailbox," by Rob Verger, Apr. 26, 2018. (Year: 2018).*

"Is package delivery coming to the trunk of your car? Volkswagen thinks so," by Kevin Lisota, Jan. 9, 2016 (Year: 2016).*

\* cited by examiner

FIG. 3

| IDENTIFICATION NO | VEHICLE MANUFACTURER | VEHICLE TYPE | NUMBER | PARKING LOT ADDRESS | VEHICLE POSITION | COLOR | PLACE OF USE | PICK-UP AND DELIVERY DATE AND TIME | PICK-UP AND DELIVERY CLASSIFICATION | PACKAGE ATTRIBUTE |
|---|---|---|---|---|---|---|---|---|---|---|
| S001 | ... | ... | xxyy | ** SI ** KU ** CHOME ... | LATITUDE (LA1), LONGITUDE (LO1) | WHITE | TRUNK (CAN BE INCLINED) | 11/01/2017 12:00 TO 15:00 | DELIVERY | VERTICAL: ** HORIZONTAL: ** DEPTH: ** WEIGHT: ** TYPE: ** |

FIG. 4

| VEHICLE ID | PERIOD OF USE | FORM OF USE | STATUS OF USE | PACKAGE ATTRIBUTE | USER ID | USER TERMINAL | PLACE OF USE | NUMBER OF USERS | VEHICLE POSITION | PARKING LOT ADDRESS |
|---|---|---|---|---|---|---|---|---|---|---|
| S001 | 11/01/2017 12:00 TO 15:00 | DELIVERY | COMPLETED | ... | PA30X21 | ZZZZZ | REAR SEAT ON PASSENGER SEAT SIDE | | | |
| | 11/02/2017 09:00 TO 12:00 | PICKUP | COMPLETED | ... | G08X02B | AAAAA | TRUNK | | | |
| | ... | ... | ... | ... | ... | ... | | ... | LATITUDE (LA1), LONGITUDE (LO1) | ** SI ** KU ** CHOME ... |
| | 11/29/2017 14:00 TO 18:00 | DELIVERY | NOT COMPLETED | ... | PA30X21 | ZZZZZ | PASSENGER SEAT | | | |

FIG. 5

| VEHICLE ID | PARKING STATE | SURROUNDINGS SITUATION | DEVICE ID |
|---|---|---|---|
| S001 | BACKWARD, 11/01/2017 /12:39 | LEFT SIDE IN FRONT OF VEHICLE(PRESENCE), RIGHT SIDE IN FRONT OF VEHICLE(ABSENCE), PASSENGER SEAT SIDE(PRESENCE), DRIVER SEAT SIDE(ABSENCE), LEFT SIDE BEHIND VEHICLE(PRESENCE), RIGHT SIDE BEHIND VEHICLE(ABSENCE), CENTER BEHIND VEHICLE (ABSENCE) | AAAAA |

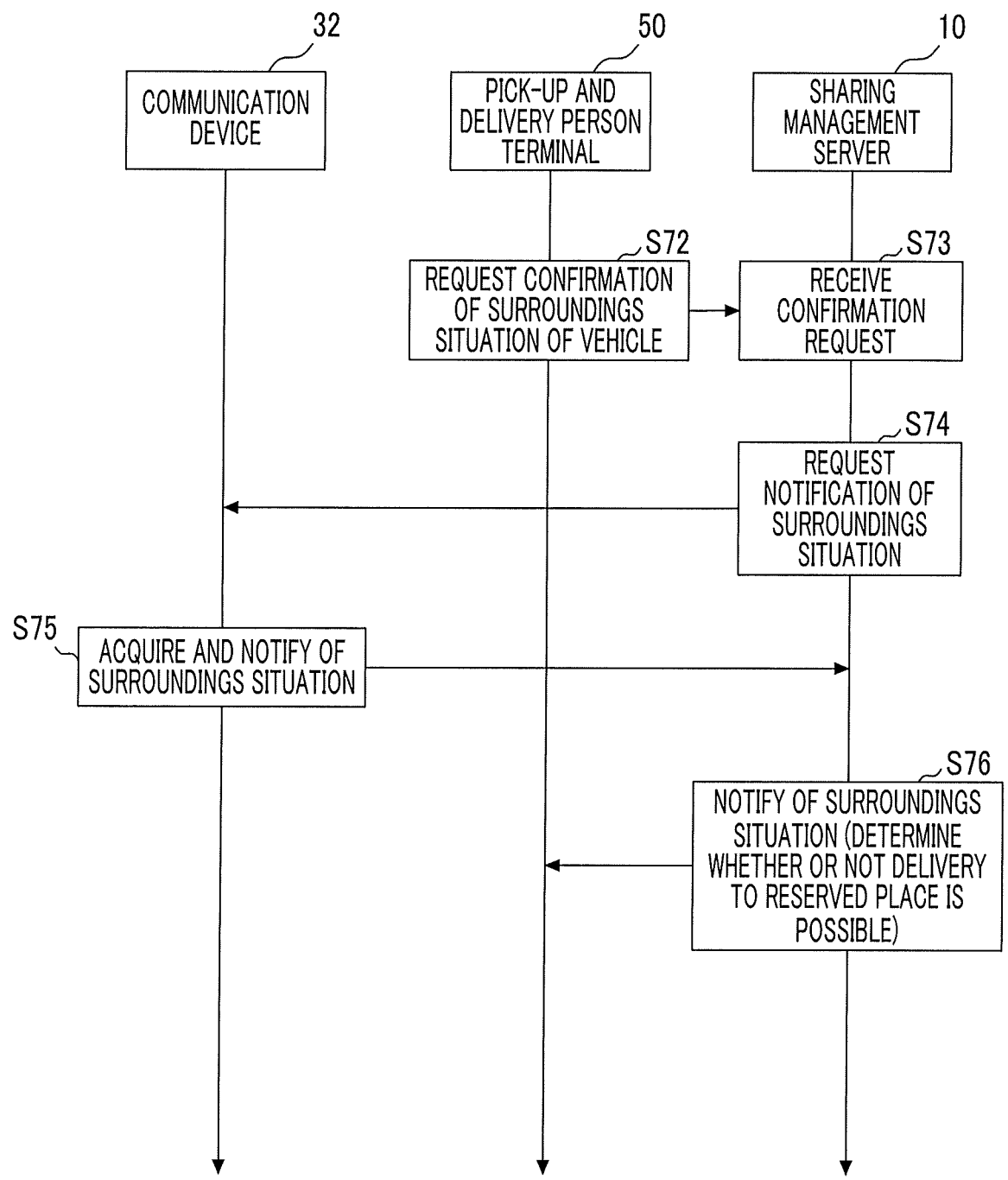

INFORMATION SYSTEM, INFORMATION PROCESSING METHOD, AND NON-TRANSITORY COMPUTER-READABLE RECORDING MEDIUM

INCORPORATION BY REFERENCE

The disclosure of Japanese Patent Application No. 2017-253847 filed on Dec. 28, 2017 including the specification, drawings and abstract is incorporated herein by reference in its entirety.

BACKGROUND

1. Technical Field

The present disclosure relates to an information system that uses a predetermined area in a vehicle as a delivery place of a pick-up and delivery product, an information processing method, and a non-transitory computer-readable recording medium in which a program for causing the information processing device to execute the information processing method has been stored.

2. Description of Related Art

In recent years, development of a trunk sharing system that is means for efficiently performing delivery of a pick-up and delivery product (a package) between a user of a pick-up and delivery service and a delivery company, and uses a package room of a vehicle designated by a user as a delivery place of the pick-up and delivery product has been progressed. For example, Japanese Unexamined Patent Application Publication No. 2006-206225 (JP 2006-206225 A) describes that mutual authentication is performed with a package reception vehicle using a business communication device provided in a vehicle of a home delivery company at the time of delivering a delivery product, and the delivery product is accommodated in a trunk. Even when a recipient is absent, reception of a delivery product becomes possible due to the package reception vehicle.

SUMMARY

Incidentally, a vehicle to be used as a package reception vehicle is parked at a predetermined position of a contracted parking lot or at a designated place designated for reception of a delivery product in advance. However, opening and closing of a door of a vehicle cabin or a package room door may be hindered and it may be difficult to deliver a package according to a parking state of the vehicle or a surroundings situation at a parking position.

The present disclosure provides a technique for suppressing a situation in which pick-up and delivery for a parked vehicle are not available, in advance.

A first aspect of the present disclosure relates to an information system. The information system manages use of one or more areas in a vehicle permitted to be used as a pick-up and delivery destination of a pick-up and delivery product. The information system includes an information processing device. The information processing device is configured to acquire state information including at least one of information on a parking state of the vehicle and information on a surroundings situation of a parking position of the vehicle, and provide determination information for assisting in a determination as to whether or not pick-up and delivery of the pick-up and delivery product to the one or more areas is possible based on the state information, to an external device that is provided external to the information processing device.

According to the configuration of the first aspect of the present disclosure, it is possible to determine whether or not pick-up and delivery of the pick-up and delivery product to one or more areas in the vehicle permitted to be used as the pick-up and delivery destination of the pick-up and delivery product based on the state information. In the first aspect of the present disclosure, places of use such as a hood, a passenger seat, a rear seat on the passenger seat side, a rear seat on the driver seat side, and a package room are illustrated as the one or more areas in the vehicle permitted to be used as the pick-up and delivery destination of the pick-up and delivery product. Further, in the first aspect of the present disclosure, a parking state in a frontward direction with respect to the parking position and a parking state in a rearward direction are illustrated as parking states at the time of parking. In the parking state in a frontward direction with respect to the parking position, the vehicle is parked in a state in which a rear side of the vehicle is directed to a path approaching the parking position. In the parking state in a rearward direction, the vehicle is parked in a state in which the front side of the vehicle is directed to the path approaching the parking position. Further, in the first aspect of the present disclosure, the presence or absence of an obstacle on the right side in front of the vehicle, the left side in front of the vehicle, the left side behind the vehicle, the side of the driver seat, the side of the passenger seat, the left side behind the vehicle, a center behind the vehicle, and the right side behind the vehicle is illustrated as the surroundings situation at the time of parking. Clearance sensors 30a to 30g are illustrated as sensors that detect the presence or absence of the obstacle in the above direction. A size (each dimension of a vertical width, a horizontal width, and a depth) and a weight of the pick-up and delivery product are illustrated as the attributes of the pick-up and delivery product. As a result, with the information system according to the first aspect of the present disclosure, it is possible to provide a technology for suppressing a situation in which pick-up and delivery to the parked vehicle is impossible in advance.

Further, in the information system according to the first aspect of the present disclosure, the information processing device may be configured to acquire package attribute information of the pick-up and delivery product, and the information processing device may be configured to provide the determination information to the external device based on the state information and the package attribute information of the pick-up and delivery product. In the aspect of the present disclosure, examples of the package attribute information of the pick-up and delivery product include information such as a size (a vertical width, a horizontal width, and a depth) of a package, a weight, whether or not the package can be inclined, and permission of placement of a pick-up and delivery product via a door (for example, a driver seat door with respect to a passenger seat door) facing an opening and closing door of the place of use. In a determination as to whether or not the pick-up and delivery is possible in the information system, the pick-up and delivery to the place of use is possible with restrictions when the state information and the package attribute information of the pick-up and delivery product satisfy predetermined conditions.

Further, in the information system according to the first aspect of the present disclosure, the information processing device may be configured to receive a condition for specifying the pick-up and delivery destination from a terminal of a user who uses the vehicle as the pick-up and delivery destination of the pick-up and delivery product, and the information processing device may be configured to provide the determination information for the vehicle that satisfies the condition to the external device. With the configuration according to the aspect of the present disclosure, the user can browse the notified result of the determination as to whether the pick-up and delivery is possible at the time of ordering the purchased product or the time of request of the pick-up and delivery of the pick-up and delivery product, and select the place of use to which the pick-up and delivery is possible. It is possible to improve convenience for users using the place of use inside the vehicle as the pick-up and delivery destination of the pick-up and delivery product.

Further, in the information system according to the aspect of the present disclosure, the information processing device may be configured to receive a reservation for use of an area serving as the pick-up and delivery destination of the pick-up and delivery product in the one or more areas from the terminal of the user, and the information processing device may be configured to determine that the pick-up and delivery of the pick-up and delivery product to the area serving as the pick-up and delivery destination is impossible based on the state information and the package attribute information after reception of the reservation for use. With the configuration according to the aspect of the present disclosure, it is possible to determine that the pick-up and delivery of the pick-up and delivery product is impossible based on the state information and the package attribute information after the vehicle is moved with respect to the place of use for which the reservation as the pick-up and delivery destination has been settled. Therefore, it is possible to suppress a situation in which the pick-up and delivery is impossible, caused by a change in the parking state or the surroundings situation of the vehicle after the reservation is settled.

Further, in the information system according to the aspect of the present disclosure, the information processing device may be configured to receive a request for acquisition of the state information from the terminal, and the information processing device may be configured to determine that the pick-up and delivery of the pick-up and delivery product to the area serving as the pick-up and delivery destination is impossible based on the state information acquired in response to the request for acquisition and package attribute information of the pick-up and delivery product the use of which has been reserved. With the configuration according to the aspect of the present disclosure, it is possible to acquire the surroundings situation of the vehicle, or the like in response to a request from the pick-up and delivery person and determine that pick-up and delivery of the pick-up and delivery product is impossible. Therefore, it is possible to suppress a situation in which the pick-up and delivery is impossible, caused by a change in the parking state or the surroundings situation immediately before the pick-up and delivery.

Further, in the information system according to the first aspect of the present disclosure, the information processing device may be configured to provide determination information to a business server that provides an electronic commerce service. With the configuration according to the aspect of the present disclosure, it is possible to provide determination information for suppression of a situation in which the pick-up and delivery to the parked vehicle is impossible to a home delivery company or a logistics company, and a company providing online shopping or the like.

A second aspect of the present disclosure relates to an information processing method. The information processing method uses an information system configured to manage use of one or more areas in a vehicle permitted to be used as a pick-up and delivery destination of a pick-up and delivery product. The information system includes an information processing device. The information processing method includes acquiring, by the information processing device, state information including at least one of information on a parking state of the vehicle and information on a surroundings situation of a parking position of the vehicle, and providing, by the information processing device, determination information for assisting in a determination as to whether or not pick-up and delivery of the pick-up and delivery product to the one or more areas is possible based on the state information, to a external device that is provided external to the information processing device.

The information processing method according to the second aspect of the present disclosure may further include acquiring, by the information processing device, package attribute information of the pick-up and delivery product, and the determination information may be provided to the external device by the information processing device based on the state information and the package attribute information of the pick-up and delivery product.

The information processing method according to the second aspect of the present disclosure may further include receiving, by the information processing device, a condition for specifying the pick-up and delivery destination from a terminal of a user who uses the vehicle as the pick-up and delivery destination of the pick-up and delivery product, and the determination information for the vehicle that satisfies the condition may be provided to the external device by the information processing device.

The information processing method according to the aspect of the present disclosure may further include receiving, by the information processing device, a reservation for use of an area serving as the pick-up and delivery destination of the pick-up and delivery product in the one or more areas from the terminal of the user, and a determination may be made by the information processing device that the pick-up and delivery of the pick-up and delivery product to the area serving as the pick-up and delivery destination is impossible based on the state information and the package attribute information after reception of the reservation for use.

The information processing method according to the aspect of the present disclosure may further include receiving, by the information processing device, a request for acquisition of the state information from the terminal, and a determination may be made by the information processing device that the pick-up and delivery of the pick-up and delivery product to the area serving as the pick-up and delivery destination is impossible based on the state information acquired in response to the request for acquisition and package attribute information of the pick-up and delivery product the use of which has been reserved.

In the information processing method according to the second aspect of the present disclosure, the determination information may be provided to a business server that provides an electronic commerce service by the information processing device.

A third aspect of the present disclosure relates to a non-transitory computer-readable recording medium storing a program for causing an information processing device to execute an information processing method of an information system configured to manage use of one or more areas in a vehicle permitted to be used as a pick-up and delivery destination of a pick-up and delivery product. The program causes a control process of the information system to be executed. The control process includes acquiring, by the information processing device, state information including at least one of information on a parking state of the vehicle and information on a surroundings situation of a parking position of the vehicle, and providing, by the information processing device, determination information for assisting in a determination as to whether or not pick-up and delivery of the pick-up and delivery product to the one or more areas is possible based on the state information, to an external device that is provided external to the information processing device.

In the non-transitory computer-readable recording medium according to the third aspect of the present disclosure, the control process may further include acquiring, by the information processing device, package attribute information of the pick-up and delivery product, and in the control process, the information processing device may provide determination information to the external device based on the state information and the package attribute information of the pick-up and delivery product.

In the non-transitory computer-readable recording medium according to the third aspect of the present disclosure, the control process may further include receiving, by the information processing device, a condition for specifying the pick-up and delivery destination from a terminal of a user who uses the vehicle as the pick-up and delivery destination of the pick-up and delivery product, and in the control process, the information processing device may provide the determination information for the vehicle that satisfies the condition to the external device.

In the non-transitory computer-readable recording medium according to the aspect of the present disclosure, the control process may further include receiving, by the information processing device, a reservation for use of an area serving as the pick-up and delivery destination of the pick-up and delivery product in the one or more areas from the terminal of the user, and in the control process, the information processing device may determine that the pick-up and delivery of the pick-up and delivery product to the area serving as the pick-up and delivery destination is impossible based on the state information and the package attribute information after reception of the reservation for use.

In the non-transitory computer-readable recording medium according to the aspect of the present disclosure, the control process may further include receiving, by the information processing device, a request for acquisition of the state information from the terminal, and in the control process, the information processing device may determine that the pick-up and delivery of the pick-up and delivery product to the area serving as the pick-up and delivery destination is impossible based on the state information acquired in response to the request for acquisition and package attribute information of the pick-up and delivery product the use of which has been reserved.

In the non-transitory computer-readable recording medium according to the third aspect of the present disclosure, in the control process, the determination information may be provided to a business server that provides an electronic commerce service by the information processing device.

The aspects of the present disclosure can be ascertained as the information system including at least some of the above processes or means, or the information processing device. Further, the present disclosure can be ascertained as the information processing method for executing at least some of the processes that are performed by the above means. Further, the aspects of the present disclosure can be ascertained as the non-transitory computer-readable recording medium storing a program for causing the information processing device to execute the information processing method. The above processes or means can be freely combined and implemented as long as technical contradiction does not occur.

According to the aspects of the present disclosure, it is possible to provide a technology for suppressing a situation in which pick-up and delivery to the parked vehicle is impossible in advance.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 3 is a table illustrating vehicle information disclosed in a pick-up and delivery person terminal;

FIG. 4 illustrates a table of sharing management information;

FIG. 5 illustrates a table of parking state information;

FIG. 18 is a sequence diagram illustrating an example of a flow of a pick-up and delivery process.

DETAILED DESCRIPTION OF EMBODIMENTS

Hereinafter, a trunk sharing system according to an embodiment will be described with reference to the drawings. A configuration of the following embodiment is an example, and this trunk sharing system is not limited to a configuration of the embodiment.

1. System Configuration

Figure 1:
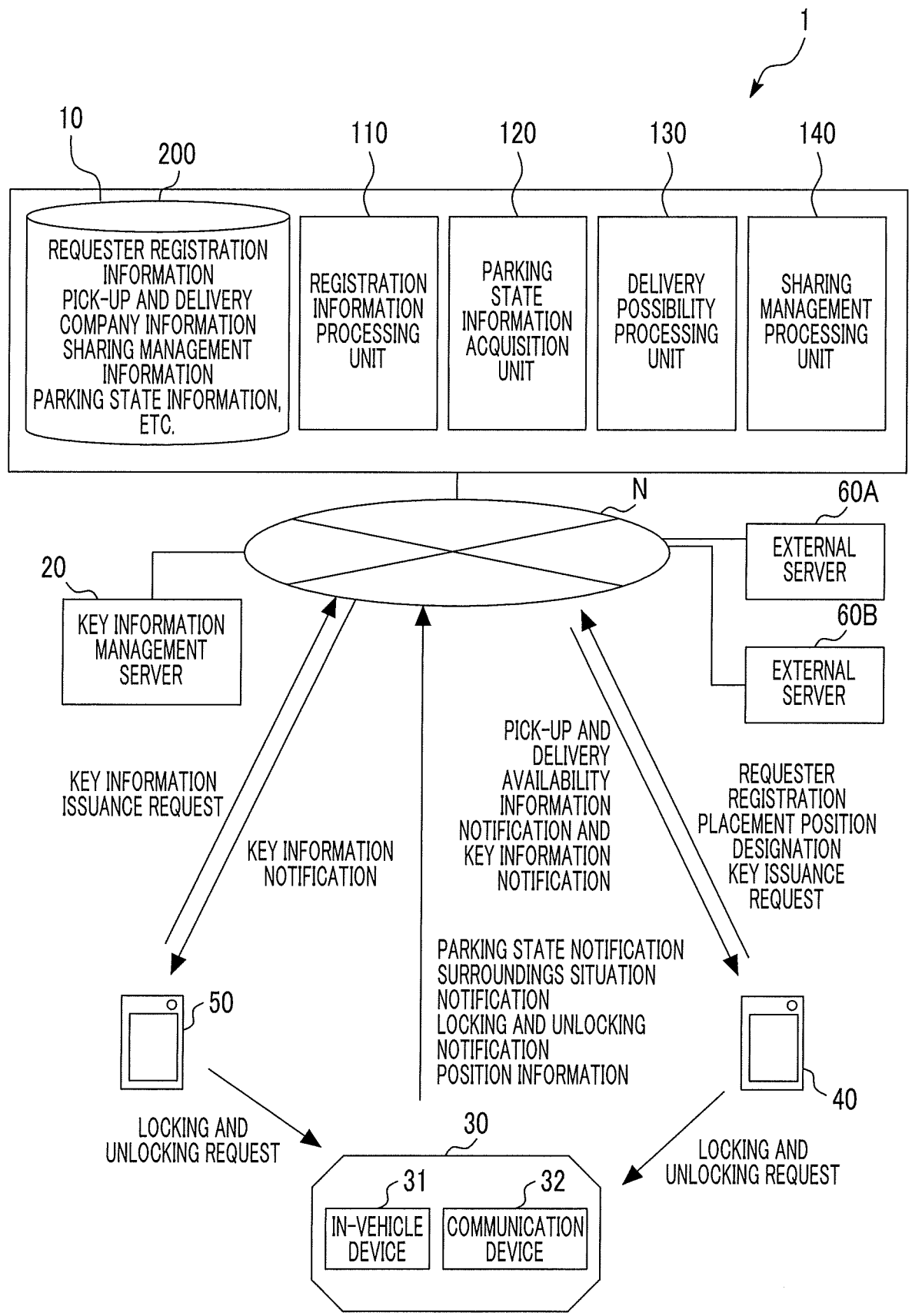
FIG. 1 is a diagram illustrating an example of a configuration of a trunk sharing system according to an embodiment.

FIG. 1 is a diagram illustrating an example of a configuration of a trunk sharing system 1 according to an embodiment. The trunk sharing system 1 is a system for providing a sharing service in which a vehicle cabin, a package room (a trunk room), or the like of a vehicle 30 can be commonly used as a delivery place for a pick-up and delivery product between a person requesting pick-up and delivery work and a person performing the pick-up and delivery work. In the following embodiments, using a package room or the like of a vehicle commonly is referred to as trunk sharing. Further, a sharing service provided by the trunk sharing system 1 is referred to as a trunk sharing service. Furthermore, the trunk sharing service is also simply referred to as trunk sharing. Note that the trunk sharing system 1 of the embodiment may provide a service for sharing at least a part of the vehicle among a plurality of persons. Hereinafter, "sharing" is assumed to include at least one of commonly using and sharing. Here, the "person requesting pick-up and delivery work" is a user who uses the vehicle cabin, the package room, or the like of the vehicle 30 as a delivery destination of a delivery product or a pick-up destination of a package, and is also referred to as a "requesting user". An example of the requesting user includes a user using a vehicle lent for use of trunk sharing as a delivery destination or a pick-up and delivery destination, in addition to an owner of the vehicle 30 and the owner or a rightful person of the vehicle 30. The "person performing pick-up and delivery work" is a person picking up and delivering a delivery product of which a delivery destination is a vehicle cabin, a package room, or the like of the vehicle 30 or a package stored in the vehicle cabin, the package room, or the like of the vehicle 30 as a pick-up product, and is also referred to as a "pick-up and delivery user". The pick-up and delivery user includes a home delivery company that provides a home delivery service that delivers a delivery product or the like to a delivery destination, or a logistics company that provides a transportation service between bases of a delivery product or the like. In addition, in the following description, for example, a hood, a passenger seat, or a rear seat of the vehicle 30 is included in a vehicle cabin, a package room, or the like to be used as a place of delivery of a pick-up and delivery product. Hereinafter, the vehicle cabin, the package room, or the like is simply referred to as a package room or the like.

The trunk sharing system 1 illustrated in FIG. 1 includes a sharing management server 10, a key information management server 20, an in-vehicle device 31 mounted in the vehicle 30, and a communication device 32 which are connected to each other by a network N. For example, the sharing management server 10 is a computer that is used a providing company that provides the sharing service to the requesting user registered in advance and the pick-up and delivery user commonly using the package room or the like of the vehicle 30 as a delivery destination or a pick-up destination. Here, the "providing company" is a business entity that provides the sharing service according to the embodiment as a business. The providing company provides the above-described sharing service to the vehicle 30 that can be locked or unlocked using an electronic key. Examples of the providing company include a home delivery company providing a home delivery service in which a delivery product or the like is delivered to a delivery destination, a logistics company providing a transportation service between bases of a delivery product or the like, and an electronic commerce company providing online shopping as a business. However, the providing company may be a brokerage company such as a trading company or agent who mediates sales of the vehicle 30, and may be a rental agent or a leasing company providing a rental service, a lending service, or the like of the vehicle 30, or a plurality of cooperating rental companies or leasing companies. Alternatively, any one of a cooperating organization by a manufacturer or a dealer of the vehicle 30, a division of the manufacturer, an affiliated company, a trading company or an agent, a rental agent or a leasing company, a home delivery company or a logistics company, and an electronic commerce company functions as a providing company in some cases.

For example, the providing company cooperates with the key information management server 20 that operates a service site including the sharing management server 10 and manages key information enabling unlocking or locking of the package room or the like of the vehicle 30, and provides a sharing service according to a parking state of the vehicle 30 and a surrounding environment at the time of parking.

The sharing management server 10 includes at least a sharing management database (DB) 200. In addition, the sharing management server 10 provides at least information processing functions of a registration information processing unit 110, a parking state information acquisition unit 120, a delivery possibility processing unit 130, and a sharing management processing unit 140. Here, the sharing management server 10 may be a single computer or a group of a plurality of computers, such as a system called a cloud. Similarly, the sharing management DB 200 may be constructed by a single database server or a plurality of database servers.

In the trunk sharing system 1, the sharing management server 10 is connected to the network N. The network N includes a public network such as the Internet, a wireless network of a mobile phone network, a dedicated network such as a virtual private network (VPN), and a network such as a local area network (LAN).

The key information management server 20 that manages key information of the package room or the like of the vehicle 30 is connected to the network N. Further, the communication device 32 of the vehicle 30 and the requester terminal 40 of the requesting user are connected to the network N. When the requesting user is a key manager having a regular key of the vehicle 30, the requesting user can unlock or lock the vehicle 30 at any time. Here, the "regular key" means an electronic key for which there is no setting of an expiration date. However, when the requesting user is not the key manager having the regular key of the vehicle 30, the requester terminal 40 is caused to operate as a temporary electronic key using the key information issued from the key information management server 20.

The communication device 32 of the vehicle 30 is a wireless communication device that can be connected to the network N. The communication device 32 is connected to an in-vehicle network such as a controller area network (CAN) in the vehicle 30. The communication device 32, for example, interlocks with a car navigation device or a global positioning system (GPS) unit (not illustrated) mounted on the vehicle 30 and acquires various types of information such as congestion information, road situation, weather information, and news information according to a current position of the vehicle 30.

In the embodiment, for example, the communication device 32 acquires a parking state of a subject vehicle, a surroundings situation at the time of parking, and position information of the subject vehicle when an accessory power supply (ACC) is OFF or the subject vehicle parks at a designated place, and notifies the parking state, the surroundings situation, and the position information the sharing management server 10. The parking state of the subject vehicle and the surroundings situation at the time of parking are acquired, for example, via an electronic control unit (ECU) connected to the in-vehicle network. The time of "ACC-OFF" refers to, for example, a period of time before the ECU receives an ACC-OFF request and executes OFF of the accessory power supply. For example, the communication device 32 acquires a shift lever position immediately before a parking position ("P") of the shift lever is reached, as the parking state of the vehicle. When the shift lever position has transitioned from a range "R" indicating a backward movement to a range "P", the communication device 32 notifies the sharing management server 10 that the subject vehicle is in a parking state in a rearward direction. Similarly, when the shift lever position has transitioned from a range "D" indicating forward driving to the range "P", the communication device 32 notifies the sharing management server 10 that the subject vehicle is in a parking state in a frontward direction. The communication device 32 may notify the sharing management server 10 of the shift lever position immediately before the parking position ("P") of the shift lever is reached in association with the time information. The sharing management server 10 may determine the transition of the lever position to the parking position ("P") from the notified shift lever position and the time information, and specify the parking state of the vehicle 30. Further, the communication device 32 acquires the surroundings situation at the time of parking detected via a sensor and notifies the sharing management server 10 of the surroundings situation. Examples of such a sensor include a clearance sensor (clearance sonar) that detects the presence or absence of an obstacle present in a certain range around the vehicle and a door mirror sensor. The communication device 32 may notify the sharing management server 10 of image information acquired through a drive recorder, a back view monitor, or the like.

In addition, a pick-up and delivery person terminal 50 of a pick-up and delivery person who picks up and delivers, as a collected product, a delivery product of which a delivery destination is the package room or the like of the vehicle 30 or a package stored in the package room or the like of the vehicle 30 is connected to the network N. The pick-up and delivery person is an employee of the pick-up and delivery user or an implementer who receives entrustment from the pick-up and delivery user and performs pick-up and delivery work. Further, an external server 60A operated by an electronic commerce company or the like providing online shopping as a business, and an external server 60B operated by a pick-up and delivery user providing a delivery service for delivering a delivery product or the like to a delivery destination or a transportation service between bases of delivery products are connected to the network N. A plurality of other key information management servers 20 (not illustrated), communication devices 32 of the vehicle 30, requester terminals 40, pick-up and delivery person terminals 50, and external servers 60A, 60B can be connected to the network N.

In the embodiment, the requesting user selects the vehicle 30 that can be commonly used as a delivery place of a pick-up and delivery product with respect to the pick-up and delivery user via the requester terminal 40. The selected vehicle 30 is registered in the sharing management server 10 as a delivery destination and a pick-up destination of a pick-up and delivery product. An application program (hereinafter referred to as an "assistance application") for assisting in trunk sharing service is also provided to the requester terminal 40 from the sharing management server 10 at the time of registering the requester information for specifying the requesting user or after registration of the requester information. A sharing service provided by the trunk sharing system 1 according to the embodiment is provided to the requesting user via an assistance application. As will be described below, a sharing service including presentation of the place of use such as the package room on which a determination as to the possibility of pick-up and delivery has been performed according to the parking state of the vehicle 30 and the surrounding environment at the time of parking is provided to the requesting user. Further, for example, when the sharing management server 10 receives a request for issuance of temporary key information on the vehicle 30 from the requesting user or the pick-up and delivery person, the sharing management server 10 notifies the cooperating key information management server 20 that the issuance request has been received. The key information management server 20, for example, issues key information causing the requester terminal 40 and the pick-up and delivery person terminal 50 to function as a temporary electronic key based on information including the identification information of the vehicle 30, a place of use, and the time information when the notification is received. The issued key information is transmitted to, for example, the requester terminal 40 and the pick-up and delivery person terminal 50 via the sharing management server 10.

The key information management server 20 is, for example, an information processing device such as a personal computer (PC), a work station (WS), or a server possessed by a management company who manages key information enabling locking and unlocking of the vehicle 30. However, the key information management server 20 may be a single computer or may be a system configured of a group of a plurality of computers such as a cloud. The management company having the key information management server 20 is, for example, a department of a manufacturer of the vehicle 30 or an affiliated company, or a company that operates key information management work by being entrusted from the manufacturers or the providing company.

In cooperation with the sharing management server 10, the key information management server 20 issues key information according to a form of use of the trunk shared vehicle 30. Here, the key information is authentication information for using the vehicle 30 that can be locked or unlocked using an electronic key. For example, vehicle-side authentication information is registered in the in-vehicle device 31 mounted in the vehicle 30. The vehicle-side authentication information registered in the in-vehicle device 31, for example, is managed by the key information management server 20 in association with the identification information of the vehicle 30 in which the in-vehicle device 31 is mounted.

When there has been a request for issuance of a one-time key from the sharing management server 10, the key information management server 20 issues authentication information temporarily enabling locking or unlocking of the vehicle 30 as key information based on the vehicle-side authentication information associated with the vehicle 30. The issued one-time key is transmitted to the requester terminal 40 and the pick-up and delivery person terminal 50 which have made a request for issuance via the network N. For example, when the requesting user or the pick-up and delivery person succeeds in authenticating of the in-vehicle device 31 using the one-time key of the requester terminal 40 and the pick-up and delivery person terminal 50, the requesting user or the pick-up and delivery person can lock or unlock the lock of the package room or the like of the vehicle 30 via the in-vehicle device 31.

2. Hardware Configuration

Figure 2:
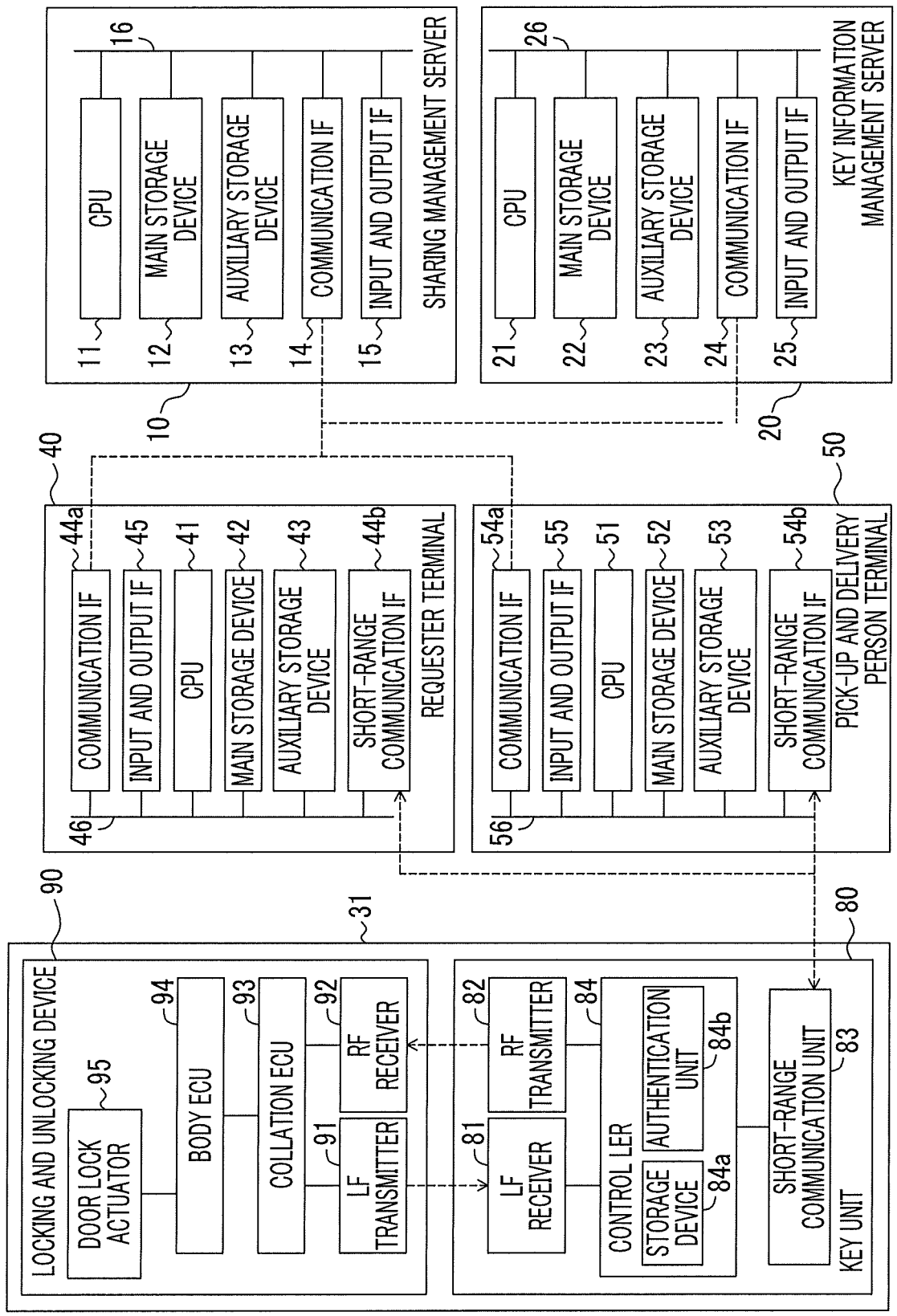
FIG. 2 is a block diagram illustrating an example of a hardware configuration of an in-vehicle device, a user terminal, an owner terminal, a sharing management server, and a key information management server.

FIG. 2 is a diagram illustrating each hardware configuration of the sharing management server 10, the key information management server 20, the in-vehicle device 31, the requester terminal 40, and the pick-up and delivery person terminal 50 constituting the trunk sharing system 1. Since the configuration of the external servers 60A, 60B illustrated in FIG. 1 is the same as that of the sharing management server 10, the configuration will be omitted in FIG. 2. In the embodiment, the in-vehicle device 31 includes a key unit 80 and a locking and unlocking device 90. The key unit 80 includes the same wireless interface as an electronic key (hereinafter referred to as a portable device) called a smart key, and performs communication with a previously provided locking and unlocking device 90 constituting the in-vehicle device 31. The requesting user who uses the package room or the like of the vehicle 30 as a pick-up and delivery destination of a package receives, for example, authentication of the key unit 80 for the authentication information held in the requester terminal 40 and thereby can perform locking or unlocking of the package room, the vehicle cabin, or the like of the vehicle 30 without using a physical key. That is, the key unit 80 performs short-range wireless communication with the requester terminal 40 or the pick-up and delivery person terminal 50 (hereinafter referred to as the requester terminal 40 or the like) that holds the authentication information, and decides whether or not the key unit 80 behaves as an electronic key of the vehicle 30 based on a result of having authenticated the requester terminal 40 or the like.

The requester terminal 40 or the like issues authentication information for locking or unlocking the package room or the like at the time of accessing the package room or the like of the vehicle 30 for delivery and pick-up of the pick-up and delivery package, to the key information management server 20 via the sharing management server 10, as described above. The authentication information transmitted from the requester terminal 40 or the like to the key unit 80 is collated with the vehicle-side authentication information stored in the key unit 80 in advance. When the authentication process is successful, the requester terminal 40 or the like is authenticated as a terminal that operates the in-vehicle device 31 legitimately. When the requester terminal 40 or the like is authenticated, the key unit 80 transmits a key ID of the vehicle 30 stored in the key unit 80 in advance and associated with the vehicle-side authentication information to the locking and unlocking device 90 together with the locking or unlocking signal. The locking and unlocking device 90 locks or unlocks the vehicle 30 when the key ID received from the key unit 80 matches the key ID stored in the locking and unlocking device 90 in advance. The key ID stored in the key unit 80 in advance may be encrypted by the vehicle-side authentication information. In this case, when the authentication process of the requester terminal 40 or the like is successful, the key unit 80 may decrypt the key ID with the vehicle-side authentication information and then transmit the key ID to the locking and unlocking device 90. The key unit 80 and the locking and unlocking device 90 operate with electric power supplied from a battery mounted on the vehicle 30. However, the key unit 80 and the locking and unlocking device 90 may be operated with electric power supplied from a general battery, in addition to the battery mounted on the vehicle 30.

The locking and unlocking device 90 is a device for locking or unlocking the door of the vehicle cabin or the package room of the vehicle 30, and is a device that has been provided in advance, constituting a part of a smart key system. The locking and unlocking device 90 locks or unlocks the door of the vehicle 30 according to a locking signal and an unlocking signal transmitted from a portable device corresponding to the vehicle 30 via radio waves in a radio frequency (hereinafter referred to as RF) band. In addition, the locking and unlocking device 90 has a function of transmitting radio waves in a low frequency (hereinafter referred to as LF) band for searching for the portable device.

In the embodiment, the key unit 80 transmits or receives radio waves in the RF band and the LF band to or from the locking and unlocking device 90 instead of the portable device, thereby controlling locking or unlocking of the door of the vehicle 30. Hereinafter, the communication destination of the locking and unlocking device 90 is limited to the key unit 80, unless otherwise noted, and description will be given.

The locking and unlocking device 90 includes an LF transmitter 91, an RF receiver 92, a collation ECU 93, a body ECU 94, and a door lock actuator 95. The LF transmitter 91 is means for transmitting radio waves in a low frequency band (for example, 100 KHz to 300 KHz) for searching for (polling) the key unit 80. The LF transmitter 91 is built into, for example, the vicinity of a center console or a steering wheel in the vehicle cabin. The RF receiver 92 is means for receiving radio waves in a high frequency band (for example, 100 MHz to 1 GHz) transmitted from the key unit 80. The RF receiver 92 is built into any place in the vehicle cabin.

The collation ECU 93 is a computer that performs control of locking and unlocking the door of the vehicle cabin or the package room of the vehicle 30 based on the signal (the locking signal or the unlocking signal) transmitted from the key unit 80 via radio waves in the RF band. The collation ECU 93 includes, for example, a microcomputer. In the following description, the locking signal and the unlocking signal are also referred to as a locking or unlocking signal. A term the locking and unlocking signal is a generic term and represents at least one of a locking signal and an unlocking signal.

The collation ECU 93 authenticates that the locking and unlocking signal transmitted from the key unit 80 is transmitted from an authorized device. Specifically, a determination is made whether or not the key ID included in the locking and unlocking signal matches the key ID stored in the storage device of the collation ECU 93 in advance. The collation ECU 93 transmits an unlocking command or a locking command to the body ECU 94 based on a result of the determination. The unlocking command or the locking command is transmitted to the body ECU 94 via an in-vehicle network such as a CAN.

The body ECU 94 is a computer that performs body control of the vehicle 30. The body ECU 94 has a function of controlling the door lock actuator 95 based on the unlocking command or the locking command received from the collation ECU 93 so that unlocking and locking of the vehicle cabin door and the package room door of the vehicle 30 are performed at the same time or independently. The hood of the vehicle 30 is accessed through a manipulation of a predetermined part provided near the driver seat after the vehicle cabin door is unlocked. The collation ECU 93 and the body ECU 94 may be integrated.

The door lock actuator 95 is an actuator that locks or unlocks a getting-in or out door, a rear gate, and the package room door of the vehicle 30 which is opened and closed at the time of loading and unloading of a package to or from the package room. The door lock actuator 95 operates based on a signal transmitted from the body ECU 94. The door lock actuator 95 may be configured to be able to independently lock or unlock the getting-in or out door or the rear gate and the package room door of the vehicle 30.

Next, the key unit 80 will be described. The key unit 80 is a device disposed at a predetermined position (for example, inside a glove box) in the vehicle cabin of the vehicle 30. The key unit 80 has a function of performing short-range wireless communication with the requester terminal 40 or the like to authenticate the requester terminal 40 or the like, and a function of transmitting a locking and unlocking signal using radio waves in the RF band based on a result of the authentication. The key unit 80 includes an LF receiver 81, an RF transmitter 82, a short-range communication unit 83, and a controller 84.

The LF receiver 81 is means for receiving a polling signal transmitted from the locking and unlocking device 90 via radio waves in the LF band. The LF receiver 81 has an antenna (hereinafter referred to as LF antenna) for receiving the radio waves in the LF band. The RF transmitter 82 is means for transmitting the locking and unlocking signal to the locking and unlocking device 90 via the radio waves in the RF band.

The short-range communication unit 83 is means for communicating with the requester terminal 40 or the like. The short-range communication unit 83 performs communication in a short range (to the extent that communications can be performed inside and outside the vehicle cabin) using a predetermined wireless communication standard.

In the embodiment, the short-range communication unit 83 performs data communication according to the Bluetooth (registered trademark) Low Energy standard (hereinafter referred to as BLE). BLE is a low power communication standard based on Bluetooth, and has characteristics that communication can be started immediately by detecting a partner without requiring pairing of devices. Although the BLE is illustrated in the embodiment, other wireless communication standards can also be used. For example, near field communication (NFC), an Ultra-wideband (UWB), WiFi (registered trademark), or the like can be used.

The controller 84 is a computer that performs short-range wireless communication with the requester terminal 40 or the like via the short-range communication unit 83 to perform control for authenticating the requester terminal 40 or the like and control for transmitting the locking and unlocking signal based on a result of the authentication. The controller 84 includes, for example, a microcomputer.

The controller 84 includes a storage device 84a and an authentication unit 84b. A control program for controlling the key unit 80 is stored in the storage device 84a. The controller 84 may realize various functions including the authentication unit 84b by a CPU (not illustrated) executing the control program stored in the storage device 84a. For example, the controller 84 has a function of receiving a polling signal transmitted as radio waves in an LF band from the locking and unlocking device 90 via the LF receiver 81, a function of transmitting a locking and unlocking signal as radio waves in the RF band to the locking and unlocking device 90 via the RF transmitter 82, a function of processing communication with the requester terminal 40 or the like that is performed via the short-range communication unit 83, a function of generating a locking and unlocking signal when the authentication of the requester terminal 40 or the like by the authentication unit 84b is successful, and the like.

The authentication unit 84b performs authentication of the requester terminal 40 or the like based on the authentication information included in a locking request or an unlocking request (hereinafter collectively referred to as a locking or unlocking request) transmitted from the requester terminal 40 or the like. Specifically, the vehicle-side authentication information stored in the storage device 84a is compared with the authentication information transmitted from the requester terminal 40 or the like, and when the vehicle-side authentication information stored in the storage device 84a and the authentication information transmitted from the requester terminal 40 or the like has a predetermined relationship, a determination is made that the authentication is successful. When the vehicle-side authentication information stored in the storage device 84a and the authentication information transmitted from the requester terminal 40 or the like do not satisfy the predetermined relationship, a determination is made that authentication has failed. Here, the predetermined relationship includes not only a case where the vehicle-side authentication information stored in the storage device 84a matches the authentication information transmitted from the requester terminal 40 or the like, but also a case where results of a process such as predetermined encryption and multiplexing using two pieces of authentication information (the vehicle-side authentication information and the authentication information transmitted from the requester terminal 40 or the like) matches, a case where a result of performing a decryption process on one of the two pieces of authentication information matches a result of performing the decryption process on the other, or the like.

When the authentication unit 84b succeeds in authentication of the requester terminal 40 or the like, the locking and unlocking signal generated in response to the request received from the requester terminal 40 or the like is transmitted to the locking and unlocking device 90 via the RF transmitter 82. An authentication scheme that is performed by the authentication unit 84b may be a scheme of simply comparing two pieces of authentication information to verify identity as described above, or may be a scheme using asymmetric encryption. Hereinafter, the vehicle-side authentication information stored in the key unit 80 is also referred to as device authentication information and the authentication information transmitted from the requester terminal 40 or the like is also referred to as terminal authentication information, as needed. The key unit 80 transmits the key ID to the locking and unlocking device 90 together with the locking or unlocking signal.

The sharing management server 10 is illustrated using a general computer configuration. The sharing management server 10 includes a central processing unit (CPU) 11, a main storage device 12, an auxiliary storage device 13, a communication interface (IF) 14, and an input and output IF 15 that are connected to each other by a connection bus 16. The main storage device 12 and the auxiliary storage device 13 are computer-readable recording media. A plurality of components described above may be provided, or some of the components may not be provided.

The CPU 11 is a central processing unit that performs control of an entire computer. The CPU 11 is also referred to a microprocessor unit (MPU) or a processor. However, the CPU 11 is not limited to a single processor and may have a multiprocessor configuration. Further, a single CPU connected by a single socket may have a multi-core configuration. The CPU 11 provides, for example, a function of developing a program stored in the auxiliary storage device 13 so that the program is executable in a work area of the main storage device 12 and performing control of a peripheral device through execution of the program to provide a function according to a predetermined purpose.

The main storage device 12 stores a computer program that is executed by the CPU 11, data that is processed by the CPU 11, and the like. The main storage device 12 includes, for example, a flash memory, a random access memory (RAM), and a read only memory (ROM). The auxiliary storage device 13 readably and writably stores various programs and various pieces of data in a recording medium. The auxiliary storage device 13 is, for example, a flash memory, an erasable programmable ROM (EPROM), a silicon disk, a hard disk drive (HDD), or the like. Further, the auxiliary storage device 13 can include a portable recording medium, such as a universal serial bus (USB) memory, or a disc recording medium such as a compact disc (CD) or a digital versatile disc (DVD). The auxiliary storage device 13 stores, for example, an operating system (OS), various programs, and various tables. The OS includes, for example, a communication interface program for exchanging data with another information processing device or the like connected to the network N via the communication IF 14.

The communication IF 14 is a communication interface with the network N. As the communication IF, for example, a LAN interface board or a wireless communication circuit for wireless communication is illustrated. The input and output IF 15 is an interface that performs input and output of data to and from a device connected to a computer. For example, a keyboard, a pointing device such as a touch panel or a mouse, and an input device such as a microphone are connected to the input and output IF 15. A manipulation instruction or the like from a manipulation person who manipulates the input device is received via the input and output IF 15. Further, for example, a display device such as an LCD (Liquid Crystal Display), an EL (Electroluminescence) panel, or an organic EL panel, and an output device such as a speaker are connected to the input and output IF 15. Data or information that is processed by the CPU 11, and data or information stored in the main storage device 12 and the auxiliary storage device 13 are output via the input and output IF 15.

The sharing management server 10 provides at least information processing functions of the registration information processing unit 110, the parking state information acquisition unit 120, the delivery possibility processing unit 130, and the sharing management processing unit 140 by the CPU 11 executing the program. However, at least some of the above processing functions may be provided by a digital signal processor (DSP), an application specific integrated circuit (ASIC), a graphics processing unit (GPU), or the like. Further, at least some of the processing functions may be provided by a dedicated large scale integration (LSI) such as a field-programmable gate array (FPGA), a numerical value calculation processor, or an image processing processor, or other digital circuits.

The registration information processing unit 110 receives requester registration information input via the requester terminal 40 and registers the received requester registration information in the sharing management DB 200 in association with identification information (a telephone number, an Internet protocol (IP) address, a media access control (MAC) address, or the like) of the requester terminal 40. In addition, the registration information processing unit 110 receives pick-up and delivery company information input via the external server 60B and registers the pick-up and delivery company information in the sharing management DB 200 in association with identification information (a telephone number, an IP address, a MAC address, or the like) of the pick-up and delivery person terminal 50 to be used by the pick-up and delivery person. Further, the registration information processing unit 110 acquires an identification number of the assistance application to be provided to the requester terminal 40 and the pick-up and delivery person terminal 50, and registers the acquired identification number of the assistance application in the requester registration information and the pick-up and delivery company information.

The parking state information acquisition unit 120 acquires parking state information notified via the communication device 32 and registers the acquired parking state information in the sharing management DB 200 in association with the identification information of the vehicle 30.

Based on the parking state information, the delivery possibility processing unit 130 determines whether or not pick-up and delivery is possible according to the parking state of the vehicle 30 or the surrounding environment at the time of parking. The requesting user and the pick-up and delivery user are notified of a result of the determination as to whether the pick-up and delivery is possible. The sharing management processing unit 140 performs registration of the vehicle 30 designated as a pick-up and delivery destination and the placement place of the pick-up and delivery product in the sharing management DB 200 from the requesting user and manages a use state of trunk sharing for each vehicle. The delivery possibility processing unit 130 and the sharing management processing unit 140 will be described below with reference to FIGS. 8 to 17.

The key information management server 20 includes a CPU 21, a main storage device 22, an auxiliary storage device 23, a communication IF 24, and an input and output IF 25 connected to each other by a connection bus 26, similar to the sharing management server 10. Since the respective components of the CPU 21, the main storage device 22, the auxiliary storage device 23, the communication IF 24, and the input and output IF 25 are the same as those of the CPU 11, the main storage device 12, the auxiliary storage device 13, the communication IF 14, and the input and output IF 15 of the sharing management server 10, description thereof will be omitted.

The requester terminal 40 and the pick-up and delivery person terminal 50 are, for example, small computers such as a smartphone, a mobile phone, a tablet terminal, a personal digital assistant, or a wearable computer (a smart watch or the like). The requester terminal 40 may be a personal computer (PC) connected to the sharing management server 10 via the network N.

The requester terminal 40 includes a CPU 41, a main storage device 42, an auxiliary storage device 43, a communication IF 44a, a short-range communication IF 44b, and an input and output IF 45 connected to each other by a connection bus 46. Since the CPU 41, the main storage device 42, the auxiliary storage device 43, and the input and output IF 45 have the same configuration as that of the CPU 11, the main storage device 12, the auxiliary storage device 13, and the input and output IF 15 of the sharing management server 10, description thereof will be omitted. The communication IF 44a is a communication circuit for accessing a public network such as the Internet through a wireless network of a mobile phone network and performing data communication with the sharing management server 10 or the like. The short-range communication IF 44b is a communication circuit for performing short-range communication according to a predetermined communication standard. The predetermined communication standard is, for example, BLE, NFC, or UWB. The input and output IF 45 may include an input device such as a push button and may include an input device for inputting a video or an image of a camera or the like.

The requester terminal 40 is connected to the sharing management server 10 through execution of a browser program of the CPU 41. In the requester terminal 40, requester registration of the vehicle 30 having a package room or the like that can be commonly used as a delivery place of the pick-up and delivery product with the pick-up and delivery user is performed via the manipulation input of the requesting user. After the requester is registered, an assistance application for assisting in a trunk sharing service is provided from the sharing management server 10. In the requester terminal 40, for example, a trunk sharing service corresponding to the parking state of the vehicle 30 and the surroundings situation at the time of parking is provided through execution of the installed assistance application. As described in FIGS. 11 to 14, a place of use such as a package room or the like to which pick-up and delivery have been determined according to the parking state of the vehicle 30 and the surrounding environment at the time of parking is presented to the requester terminal 40. In the requester terminal 40, the place of use such as a package room or the like of the vehicle 30 is displayed as content written with Hyper Text Markup Language (HTML) or the like on a display device such as an LCD through execution of the assistance application. The requesting user can browse the presented place of use such as the package room or the like and select the place of use to which pick-up and delivery are possible as the delivery place of the pick-up and delivery product.

Further, the requester terminal 40 is connected to, for example, the external server 60A operated by an electronic commerce dealer or the like that provides online shopping as a business and the external server 60B operated by a pick-up and delivery company through execution of the browser program of the CPU 41. The requester terminal 40 designates information on the vehicle 30 to be used for trunk sharing as the delivery destination of the purchased product or the pick-up destination of the pick-up product through a manipulation input of the requester.

The pick-up and delivery person terminal 50 includes a CPU 51, a main storage device 52, an auxiliary storage device 53, a communication IF 54a, a short-range communication IF 54b, and an input and output IF 55 that are connected to each other by a connection bus 56, similar to the requester terminal 40. Since these configurations are same as the CPU 41, the main storage device 42, the auxiliary storage device 43, the communication IF 44a, the short-range communication IF 44b, and the input and output IF 45 of the requester terminal 40, description thereof will be omitted.

The pick-up and delivery person terminal 50 is connected to the sharing management server 10 through execution of the assistance application of the CPU 51. In the pick-up and delivery person terminal 50, disclosure of information on the vehicle 30 available as a delivery place of the pick-up and delivery product is performed through a manipulation input of the pick-up and delivery person. The information on the vehicle 30 registered as the pick-up and delivery destination of the pick-up and delivery product is displayed as content written in HTML or the like on a display device such as LCD of the pick-up and delivery person terminal 50.

FIG. 3 is a diagram illustrating information on the vehicle 30 disclosed in the pick-up and delivery person terminal 50. In FIG. 3, an example of the information on the vehicle 30 is illustrated in a table format. The information on the vehicle 30 includes information for specifying the vehicle 30 that is a pick-up and delivery destination, a parking position of the vehicle 30, a place of use at which the pick-up and delivery product is placed, and the like. In FIG. 3, as a table structure, respective fields of vehicle manufacturer, vehicle type, car number, parking lot address, vehicle position, color, place of use, pick-up and delivery date and time, pick-up and delivery classification, and package attribute are included. The vehicle manufacturer is information indicating a manufacturer that has manufactured the vehicle. The vehicle type is information indicating a type to which the vehicle belongs, such as a sedan or a one box. The car number is an automobile registration number shown on a sign (a license plate) attached to front and rear surfaces of the vehicle. The parking lot address is address information indicating a location of the parking lot at which the vehicle has been parked. The vehicle position is information indicating a parking position in the parking lot. As the vehicle position, a latitude and a longitude of the position at which the vehicle parks may be presented. The color is information indicating color of the vehicle. Instead of the color, image information of the vehicle may be presented. The place of use is information for designating a placement position of a pick-up and delivery product. Examples of the place of use include a hood, a passenger seat, a rear seat on the passenger seat side, a rear seat on the driver seat side, and a package room. The hood, the passenger seat, the rear seat on the passenger seat side, the rear seat on the driver seat side, and the package room correspond to "one or more areas in the vehicle available as a pick-up and delivery destination of a pick-up and delivery product". In addition, the place of use includes restriction matters at the time of pick-up and delivery work, such as information on whether or not inclination of a pick-up and delivery product is possible. The pick-up and delivery date and time is information indicating a date and time and a time period of the pick-up and delivery work of the corresponding vehicle 30. The pick-up and delivery classification is a classification indicating pick-up and delivery for pick-up and delivery work. The package attribute is restrictions on a size (a vertical width, a horizontal width, and a depth dimension), a weight, and a type, and the like of a pick-up and delivery product. The package attribute may be described with natural language or may be a list which is a sequence of numerical values indicating numerical values of the size, weight, type, or the like of the pick-up and delivery product. Further, the data of the package attribute itself may have a structure described in another table and linked by a pointer.

Sharing Management DB

In the sharing management server 10, at least the requester registration information, the pick-up and delivery company information, the sharing management information, and the parking state information are stored in the sharing management DB 200, as illustrated in FIG. 1.

The requester registration information is registration information of the requesting user registered in the sharing management server 10. The requester registration information includes identification information for uniquely identifying the requesting user, an address, a name, a contact other than the requester terminal 40, a registration date, and identification information of the requester terminal 40. When the requesting user is a provider of the vehicle 30 that is used for trunk sharing, the vehicle identification information for identifying the vehicle 30, place-of-use information, information for specifying a parking position of the vehicle 30, identification information of the communication device 32 mounted on the vehicle 30, and an insurance number of the vehicle 30 are included in the requester registration information. The vehicle identification information includes, for example, a model of the vehicle 30, year of manufacture, displacement, a type of vehicle, an opening and closing type of a door (sliding door type, hinged door type, or the like), a manufacturing number, and a car registration number mark (car number). The opening and closing type of the door includes an opening and closing type of the package room door. When the hood is included in the place-of-use information, a manipulation for opening and closing the hood may be included in the vehicle identification information. The place-of-use information includes designation of an area in the vehicle available as a pick-up and delivery destination of a pick-up and delivery product such as a passenger seat, a rear seat on the passenger seat side, a rear seat on the driver seat side, a trunk, or a hood, and information on a storage space (dimensions such as a vertical width, a horizontal width, a depth) of the place of use. The information for specifying the parking position of the vehicle 30 includes an address of a parking lot at which the vehicle 30 is parked at the time of using trunk sharing, and a parking position in the parking lot. The latitude and the longitude acquired via the communication device 32 may be included in place of the parking position in the parking lot. Further, the information for specifying the parking position of the vehicle 30 may include image information on the vehicle 30 and image information of the parking position at the time of providing trunk sharing. The identification information of the communication device 32 includes an IP address, a MAC address, and the like. The identification information of the requester terminal 40 includes a telephone number, an IP address, a mail address, a MAC address of the requester terminal 40, an identification number of the assistance application provided from the sharing management server 10, and the like.

Further, the requester registration information includes a period of use of the trunk sharing, a form of use, restrictions on package attributes, a billing system, an account of use, and the like. The billing system may be distinguished according to, for example, the form of use of trunk sharing, a time period of use, the number of times of use, package attribute (weight, size, type, or the like). For the requester registration information, the sharing management server 10 or a computer cooperating with the sharing management server 10 acquires information from a manufacturer of the vehicle 30, a related website, or the like based on information at the time of registration using a computer program such as a search engine, and registers the information in the sharing management DB 200. However, the requester registration information may be registered in the sharing management DB 200 by a providing company or a manager of the sharing management DB 200 entrusted by the providing company based on information at the time of requester registration.

The pick-up and delivery company information is information on pick-up and delivery users registered in the sharing management server 10. The pick-up and delivery company information includes identification information for uniquely identifying a pick-up and delivery user, a name, a business code of the pick-up and delivery user, service base information of the pick-up and delivery user, a contact address, and identification information of the pick-up and delivery person terminal 50 to be used by the pick-up and delivery person. The identification information of the pick-up and delivery person terminal 50 includes, for example, a telephone number of the pick-up and delivery person terminal 50, an IP address, a mail address, a MAC address, and an identification number of the assistance application provided from the sharing management server 10.

In addition, the pick-up and delivery company information includes, for example, a contract period, a billing system, a use account, and the like related to the key issuance service of trunk sharing. The billing system may be distinguished according to, for example, a form of use of trunk sharing, a time period of pick-up and delivery work, and the number of times of pick-up and delivery. Registration of the pick-up and delivery company information in the sharing management DB 200 is performed similarly to the requester registration.

The sharing management information is information for managing a use state of each vehicle that is used in trunk sharing. FIG. 4 is a diagram illustrating the sharing management information. In FIG. 4, an example of the sharing management information stored in the sharing management DB 200 is illustrated in a table format. As illustrated in FIG. 4, the sharing management information includes a vehicle ID, a period of use, a form of use, a status of use, a package attribute, a user ID, a user terminal, a place of use, the number of users, a vehicle position, a parking lot address. The vehicle ID is vehicle identification information for identifying the vehicle 30. The period of use is information indicating a date and time and a time period when the use of the vehicle 30 has been reserved. The form of use is a classification indication use purpose of trunk sharing. The status of use is information indicating a status of completion or incompletion of reserved use, and the package attribute is a limitation on a size, weight, type, or the like of a pick-up and delivery product. The user ID is identification information for identifying the requesting user, and the user terminal is identification information of the requester terminal 40. The place of use is a delivery destination of the pick-up and delivery product or a place inside a vehicle to be used as a storage place. The place of use includes, for example, a passenger seat, a rear seat on the passenger seat side, a rear seat on the driver seat side, a trunk, and a hood. The number of users is the number of users who use the corresponding vehicle for trunk sharing. The vehicle position is information indicating the parking position in the parking lot. A latitude and a longitude of the parking position acquired via the communication device 32, for example, is stored as the vehicle position. The parking lot address is address information indicating a location of the parking lot at which the vehicle 30 has been parked. The sharing management information may include a pick-up and delivery user name. In a state in which the reserved content of use has been completed, the sharing management information may include identification information of the pick-up and delivery person terminal 50 to which the key information has been issued, completion time of pick-up and delivery work, or the like.

The parking state information is information for managing the parking state of each vehicle 30 and the surroundings situation at the time of parking. FIG. 5 is a diagram illustrating the parking state information. In FIG. 5, an example of the parking state information stored in the sharing management DB 200 is illustrated in a table format. As illustrated in FIG. 5, the parking state information includes fields of a vehicle ID, a parking state, a surroundings situation, and a device ID. The vehicle ID is vehicle identification information for identifying the vehicle 30. In the parking state, the parking state of which the communication device 32 has notified, such as a parking state in a rearward direction with respect to the parking position or a parking state in a frontward direction, is stored together with time information. However, the transition of the lever position to the parking position ("P") of which the communication device 32 has notified and the time information may be stored. In addition, the surroundings situation includes a surroundings situation at the time of parking of which the communication device 32 is notified. For example, the presence or absence of an obstacle present in a certain range around the vehicle, which is detected through a clearance sensor or a door mirror sensor is stored as the surroundings situation. The presence or absence of an obstacle that is present in a certain range such as the right side in front of the vehicle, the left side in front of the vehicle, the side of a driver seat, the side of a passenger seat, the right side behind the vehicle, the left side behind the vehicle, or a center behind the vehicle is detected in the sensor. The presence or absence of a detected obstacle is stored together with a detection direction of the sensor in the surroundings situation. The surroundings situation may include an image itself captured through a drive recorder, a back view monitor, or the like at the time of ACC-OFF or the time of parking at a designated place. The surroundings situation may be acquired through analysis of the image captured through the drive recorder, the back view monitor, or the like. For example, images of two cameras may be converted into the same three-dimensional coordinate system, and a distance from the vehicle 30 to the obstacle may be calculated. The device ID is identification information of the communication device 32 mounted on the vehicle 30.

Figure 6:
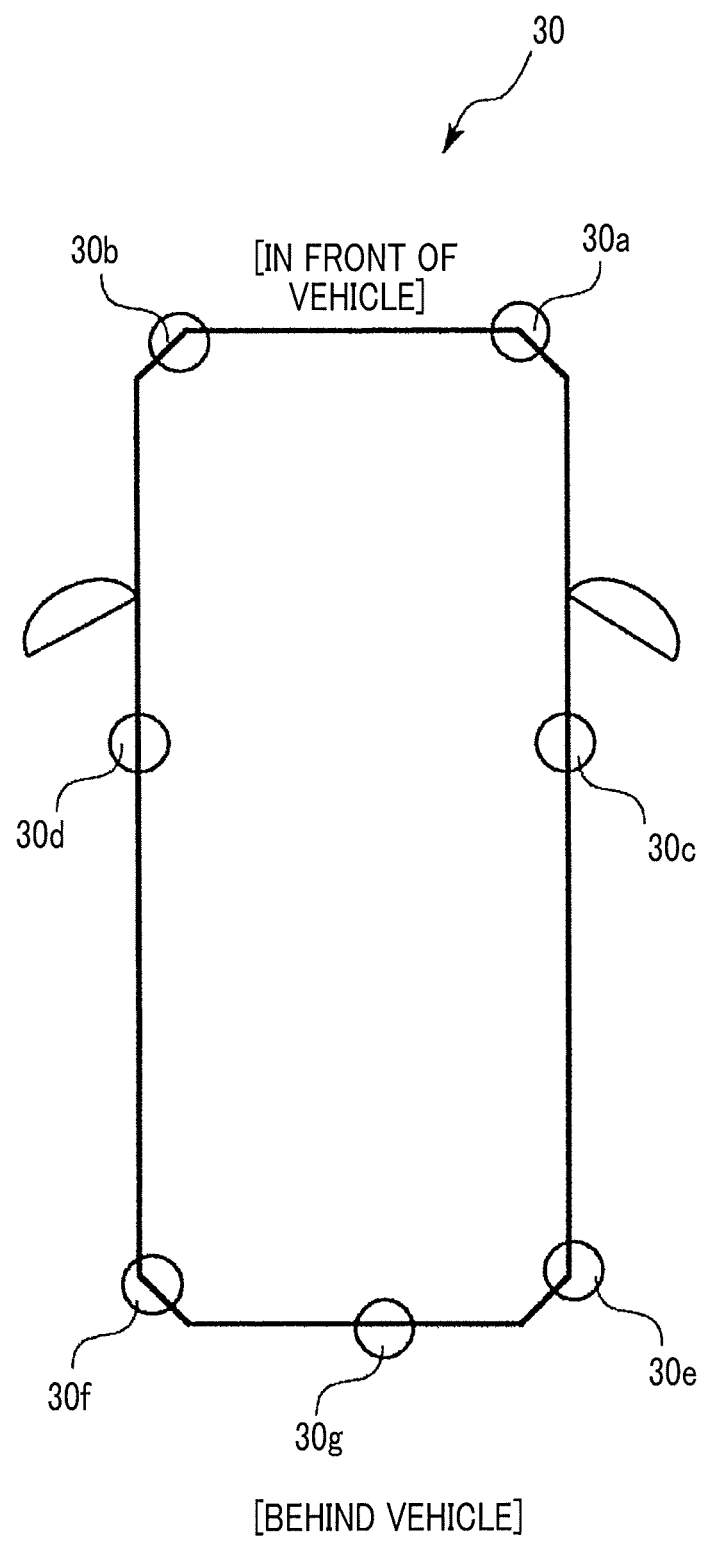
FIG. 6 is a diagram illustrating a placement position of a clearance sensor.

FIG. 6 is a diagram illustrating a placement position of the clearance sensor described above. In FIG. 6, an upward direction indicates a forward direction of the vehicle 30, and a downward direction indicates a rearward direction. In FIG. 6, a clearance sensor 30a is a sensor that detects the presence or absence of an obstacle present in a certain range on the right side in front of the vehicle. Similarly, the clearance sensor 30b is a sensor that detects the presence or absence of an obstacle present in a certain range on the left side in front of the vehicle, a clearance sensor 30c is a sensor that detects the presence or absence of an obstacle present in a certain range on the side of the driver seat, a clearance sensor 30d is a sensor that detects the presence or absence of an obstacle present in a certain range on the side of the passenger seat, a clearance sensor 30e is a sensor that detects the presence or absence of an obstacle present in a certain range on the right side behind the vehicle, a clearance sensor 30f is a sensor that detects the presence or absence of an obstacle present in a certain range on the left side behind the vehicle, and a clearance sensor 30g is a sensor that detects the presence or absence of an obstacle present in a certain range at a center behind the vehicle. In the following description, the description will be continued based on the presence or absence of an obstacle in a range around the vehicle detected by the clearance sensors 30a to 30g illustrated in FIG. 6.

3. Flow of Process

Figure 7:
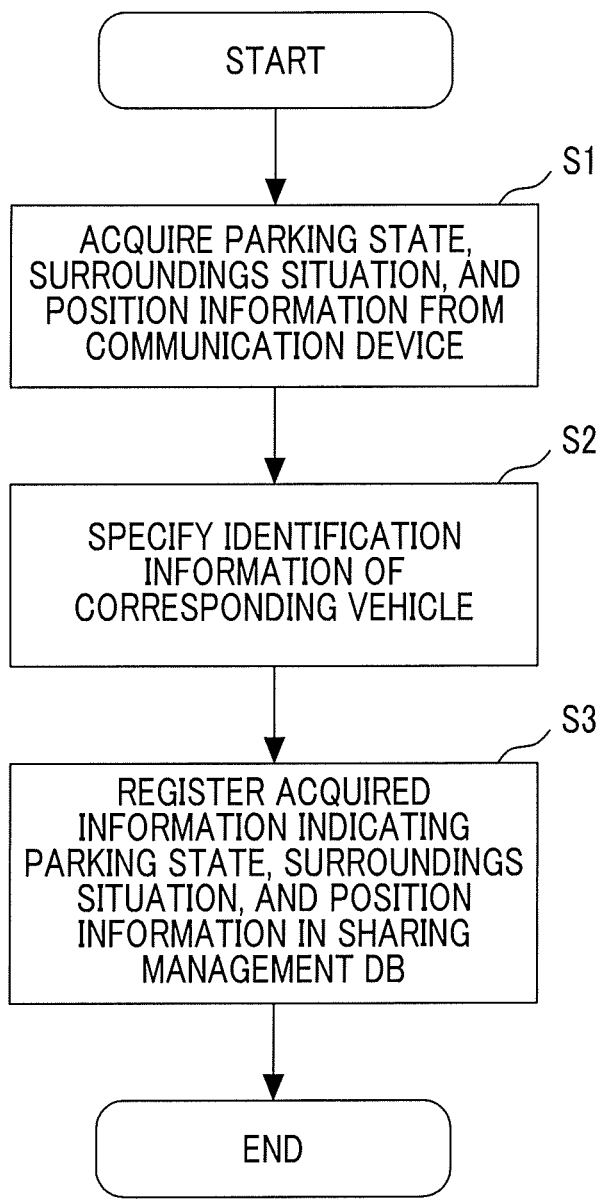
FIG. 7 is a flowchart showing an example of a process of registering parking state information.

Next, a process of the trunk sharing service according to the parking state or the surroundings situation at the time of parking provided by the sharing management server 10 according to the embodiment will be described. FIG. 7 is a flowchart showing an example of a process of registering the parking state information in the sharing management DB 200. The sharing management server 10, for example, provides processes illustrated in FIGS. 7 to 9 by the CPU 11 or the like reading and executing various programs or various pieces of data stored in the auxiliary storage device 13, and information stored in the sharing management DB 200. The process illustrated in FIG. 7 is mainly provided using the information processing function of the parking state information acquisition unit 120.

In the flowchart of FIG. 7, examples of start of the process include a time of reception of a parking state, a surroundings situation, and position information of the vehicle 30 notified via the communication device 32 at the time of ACC-OFF or parking at the designated place. The sharing management server 10 acquires, for example, the parking state, the surroundings situation, and the position information of the vehicle 30 that have been received (S1). The acquired information, for example, is temporarily stored in a predetermined area of the main storage device 12 in association with received time information and the identification information of the communication device 32.

The sharing management server 10 searches the sharing management DB 200 using the identification information of the communication device 32 as a search key and specifies the identification information of the corresponding vehicle (S2). The sharing management server 10 registers the parking state, the surroundings situation, and the position information acquired in the process of S1 as the parking state information in the sharing management DB 200 in association with the identification information of the vehicle 30 (S3). As described with reference to FIG. 6, for example, the parking state is associated with the time information, and the information indicating the surroundings situation is associated with a monitoring position of the sensor and the presence or absence of an obstacle, both of which are registered as parking state information. In addition, the parking state information may include identification information (a device ID) of the communication device 32. Further, the sharing management server 10 may register the position information (parking position) acquired from the communication device 32 in the sharing management information. After the process of S3, the process illustrated in FIG. 7 ends.

Figure 8:
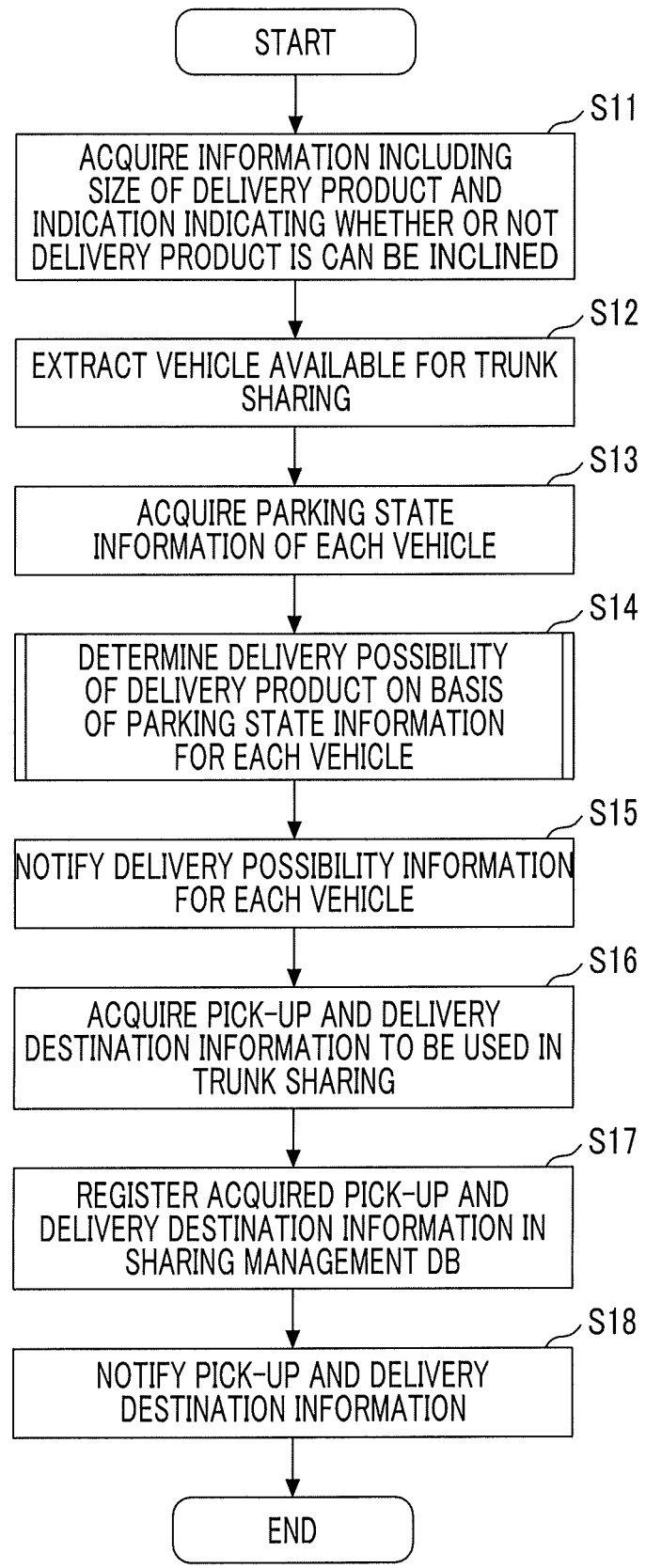
FIG. 8 is a flowchart showing an example of a process of determining whether or not delivery to a delivery destination is possible.

Next, a process of determining whether delivery to the vehicle 30 is possible in the sharing management server 10 will be described. FIG. 8 is a flowchart showing an example of the process of determining whether or not delivery to a delivery destination is possible. The process illustrated in FIG. 8 is mainly provided by the information processing functions of the delivery possibility processing unit 130 and the sharing management processing unit 140.

In execution of the process of FIG. 8, the requesting user accessing the external server 60A providing an online shopping site is assumed to request the sharing management server 10 to search for the vehicle 30 available as a delivery destination of a purchased product (a delivery product) in advance. The requesting user, for example, accesses the sharing management server 10 through the assistance application of the requester terminal 40, and requests the sharing management server 10 to search for sharing management information on the available vehicle 30 stored in the sharing management DB 200. The requesting user inputs, for example, information such as a delivery destination address of the delivery product, a date of use, a time period, a place of use, a size of the delivery product, and inclination possibility information, and requests the sharing management server 10 to perform search. The sharing management server 10 that has received the request may cause a screen for designating a size of a delivery product to be displayed on the display device of the requester terminal 40 and cause dimensions such as a vertical width, a horizontal width, and a depth, or inclination possibility information to be input, as will be described below. The sharing management server 10, for example, searches the sharing management DB 200 based on the above information and selects candidates for a day of use of the vehicle 30 available as the delivery destination of the delivery product near a delivery destination address, a time period, and a place of use from a use state of the trunk sharing. The requesting user is notified of the selected vehicle 30, date of use, time period, and place of use. The selected vehicle 30, date of use, time period, and place of use are registered as a delivery destination, a desired delivery date, a desired delivery time period, and a delivery position of a purchased product in the external server 60A providing the online shopping site via the requester terminal 40. The external server 60A notifies the external server 60B operated by the pick-up and delivery user connected to the network N of information such as the delivery destination, the desired delivery date, the desired delivery time period, and the delivery position of the purchased product that have been registered and the information for specifying the requesting user in association with each other. The external server 60B registers, for example, information on the delivery product of which the external server 60A has notified in the pick-up and delivery management information (a pick-up and delivery schedule or the like) of the pick-up and delivery product managed by the external server 60B. The external server 60B transmits, for example, a notification indicating that the delivery of the delivery product (the purchased product) has been received to the requesting user based on a telephone number, a mail address, or the like of the requester terminal 40 included in the information for specifying the requesting user. The requesting user receiving the notification from the pick-up and delivery user settles, for example, the delivery date, the time period, the place of use, and the like selected for use of the delivery product through execution of the assistance application. The sharing management server 10 registers the delivery date, time period, product attribute, use form (delivery destination n), and place of use of the delivery product, and user identification information in the sharing management information on the vehicle 30 to be used for trunk sharing.

However, the sharing management server 10, the external server 60A providing an online shopping site, and the external server 60B operated by the pick-up and delivery user may cooperate to provide the above processing procedure. For example, when the requesting user designates the vehicle 30 as the delivery destination of the purchased product in the online shopping site, the external server 60A accesses the sharing management server 10 to request specifying of the requester information of the requesting user and search for a vacant schedule of the vehicle 30 that the requesting user uses for trunk sharing. The request for search for the vacant schedule to the sharing management server 10 includes information (address, name, contact address, or the like) for specifying the requesting user, a size (dimensions such as a vertical width, a horizontal width, and a depth) of the purchased product, inclination possibility information. The external server 60A is notified of a plurality of candidates for a day of use, a time period, and a place of use available as a delivery destination of the delivery product that has been searched for based on the above information. The external server 60A may notify the requesting user of the plurality of candidates for trunk sharing of which the sharing management server 10 has been notified. For example, when the requesting user selects the vehicle 30 to be used as the delivery destination, the delivery date, the delivery time period, and the place of use from among the plurality of use candidates presented to the requester terminal 40 and settles the vehicle 30, the delivery date, the delivery time period, and the place of use, the external server 60A notifies the external server 60B of information on the settlement. The external server 60B receives, for example, information on the delivery of the purchased product of which the external server 60A has notified, and registers the information in the pick-up schedule or the like managed by the external server 60B. After registration in the pick-up schedule or the like, the external server 60B notifies the external server 60A of completion of the registration of the vehicle 30 that is a delivery destination, the delivery date and the delivery time period of the purchased product, and the like. The external server 60A notifies the sharing management server 10 and the requester terminal 40 of the delivery vehicle 30 that is a delivery destination and the delivery date and the delivery time period of the purchased product of which the external server 60B has notified, along with the pick-up and delivery company name (the pick-up and delivery user name). The sharing management server 10 may register information of the delivery vehicle 30 that is a delivery destination, the delivery date and the delivery time period of the purchased product, the pick-up and delivery company, and the like of which the external server 60A has notified, in the sharing management information of the sharing management DB 200.

In the flowchart of FIG. 8, the start of the process is illustrated as a time when a requesting user requests search for sharing management information or a time when the external server 60A cooperating with each other requests search for an available schedule. The sharing management server 10 acquires, for example, information for specifying the requesting user, information including a size of the delivery product and an indication indicating whether or not the delivery product can be inclined, and the like, which are included in the request, and temporarily stores the information in a predetermined area of the main storage device 12 in association with information on a time when the search request has been received (S11). The sharing management server 10 extracts the vehicle 30 available for trunk sharing by referring to the sharing management DB 200 (S12). The sharing management server 10 searches for, for example, the requester registration information stored in the sharing management DB 200 based on an IP address of the requester terminal 40 and specifies an address of the requesting user. The sharing management server 10 searches for the vehicle 30 available for trunk sharing registered in the sharing management DB 200 based on the specified address of the requesting user or the address of requesting user of which the external server 60A has notified. The sharing management server 10, for example, extracts the vehicle 30 for which an address of the parking lot of the vehicle 30 provided for trunk sharing is present near an area (for example, city, town or village) to which an address of a user belongs. The extraction conditions as described above are optional and can be defined as variables in the program in advance. For example, the extraction conditions may include a parking lot at which the vehicle 30, which is a target of trunk sharing, parks being present in a predetermined distance range with respect to the address of a user. For example, the vehicle 30 in the parking lot present in an area range within a radius of  km around the address of the user is extracted in unit of distance of 0.5 km, 1 km, and 3 km. The sharing management server 10 temporarily stores information for specifying the requesting user in a predetermined area of the main storage device 12 in association with the extracted vehicle identification information of the vehicle 30 and the information for specifying the parking position. The process of S11 executed by the sharing management server 10 of the trunk sharing system 1** corresponds to an example of means for acquiring package attribute information of the pick-up and delivery product.

The sharing management server 10 acquires the parking state information of each vehicle 30 extracted in the process of S12 (S13). The parking state or the surroundings situation of the vehicle 30 available for trunk sharing as a pick-up and delivery destination of the pick-up and delivery product of the requesting user is stored in the parking state information. The sharing management server 10 extracts the parking state information of each vehicle 30 stored in the sharing management DB 200 based on the vehicle identification information for each vehicle 30 extracted in the process of S12. The extracted parking state information of the vehicle 30 is temporarily stored in a predetermined area of the main storage device 12 of the sharing management server 10 in association with information for specifying the requesting user. When the transition of the lever position to the parking position ("P") and the time information is stored in the parking state information, the sharing management server 10 can determine the transition of the lever position to the parking position ("P") from the time information associated with the lever position and specify the parking state of the vehicle 30, as described above. The process of S13 executed by the sharing management server 10 of the trunk sharing system 1 corresponds to an example of means for acquiring state information including at least one of the information on the parking state of the vehicle and information on the surroundings situation of the parking position of the vehicle.

Based on the parking state information extracted in the process of S13 and the size or inclination possibility information of the delivery product acquired in the process of S11, the sharing management server 10 determines whether or not delivery of the delivery product to the corresponding vehicle 30 is possible (S14). Details of the process of S14 will be described below with reference to FIG. 9. As a result of the process of S14, delivery possibility information for each vehicle is handed over to a process of S15. Here, the delivery possibility information is information on whether delivery of the delivery product to the place of use (a hood, a passenger seat, a rear seat on the passenger seat side, a rear seat on the driver seat side, or a package room) in the vehicle 30 is possible, which is determined according to the parking state or the surroundings situation. In use possibility information, a place of use available as a delivery destination is included as a "use unrestricted area", a place of use at which use restriction on inclination of a delivery product or the like occurs is included as a "use restricted area", and a place of use unavailable as the delivery destination is included as an "unavailable area".

The sharing management server 10 notifies the requesting user or the external server 60A of the delivery possibility information for each vehicle delivered from the process of S14 (S15). The delivery possibility information, for example, is displayed as content described in HTML or the like on the display device such as the LCD of the requester terminal 40 through the assistance application. A result of a determination as to whether delivery to each place of use in the vehicle 30 is possible is presented to the requesting user, as will be described below. The requesting user, for example, selects the place of use to which the delivery is possible presented through the display device and performs a tapping manipulation or the like with respect to the selected place of use to settle the delivery destination (a placement position) of the delivery product in the vehicle 30. The settled delivery destination of the delivery product is transmitted to the sharing management server 10 via the requester terminal 40.

The sharing management server 10 receives the settlement information of the delivery destination transmitted from the requester terminal 40 and acquires the settlement information as pick-up and delivery destination information indicating the delivery destination of the delivery product (S16). The pick-up and delivery destination information includes a delivery date, a delivery time period, a place of use, information for specifying the vehicle 30, and information for specifying the requesting user. Here, the process of S16 executed by the sharing management server 10 of the trunk sharing system 1 corresponds to an example of means for receiving a reservation for use of an area serving as a pick-up and delivery destination of the pick-up and delivery product among one or more areas from the user. The sharing management server 10 registers the pick-up and delivery destination information acquired in the process of S16 in the sharing management information of the sharing management DB 200 (S17). In addition, the sharing management server 10 notifies the settled pick-up and delivery destination information to the external servers 60A, 60B (S18). Information on the vehicle 30 that becomes a pick-up and delivery destination, for example, is disclosed to the pick-up and delivery person performing pick-up and delivery work for a pick-up and delivery product via the pick-up and delivery person terminal 50. The information on the vehicle 30 disclosed in the pick-up and delivery person terminal 50 has been described with reference to FIG. 3. After the process of S18, the process illustrated in FIG. 8 ends. The processes from S14 to S18 executed by the sharing management server 10 of the trunk sharing system 1 corresponds to an example of management means for providing determination information for assisting in a determination as to whether or not pick-up and delivery of a pick-up and delivery product to one or more areas is possible based on the state information. Similarly, the process of S18 that the sharing management server 10 executes for the external server 60A corresponds to an example of management means that provides determination information to a business server providing an electronic commerce service.

Figure 9:
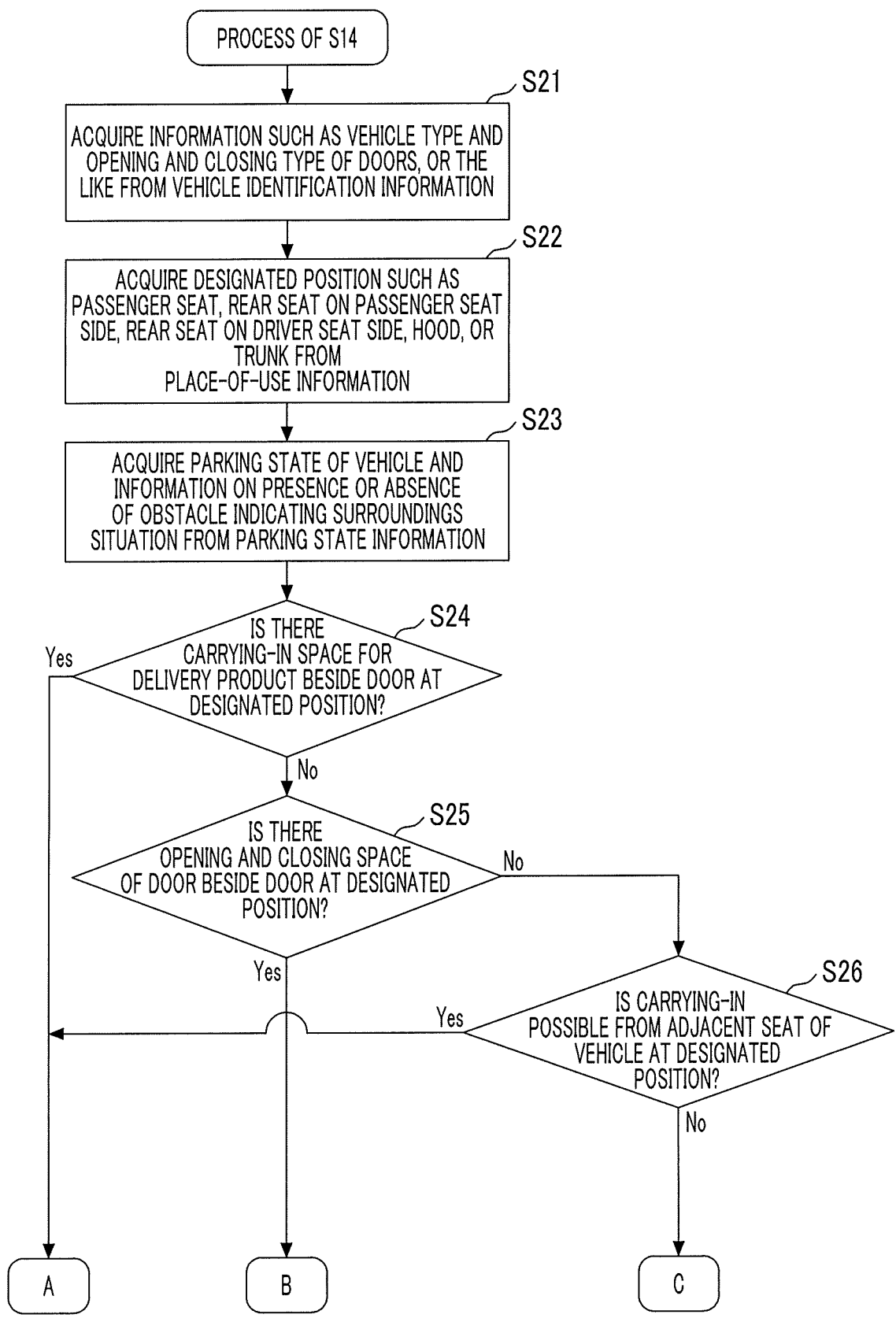
FIG. 9 is a flowchart showing an example of a detailed process of the process of S14.
Figure 10:
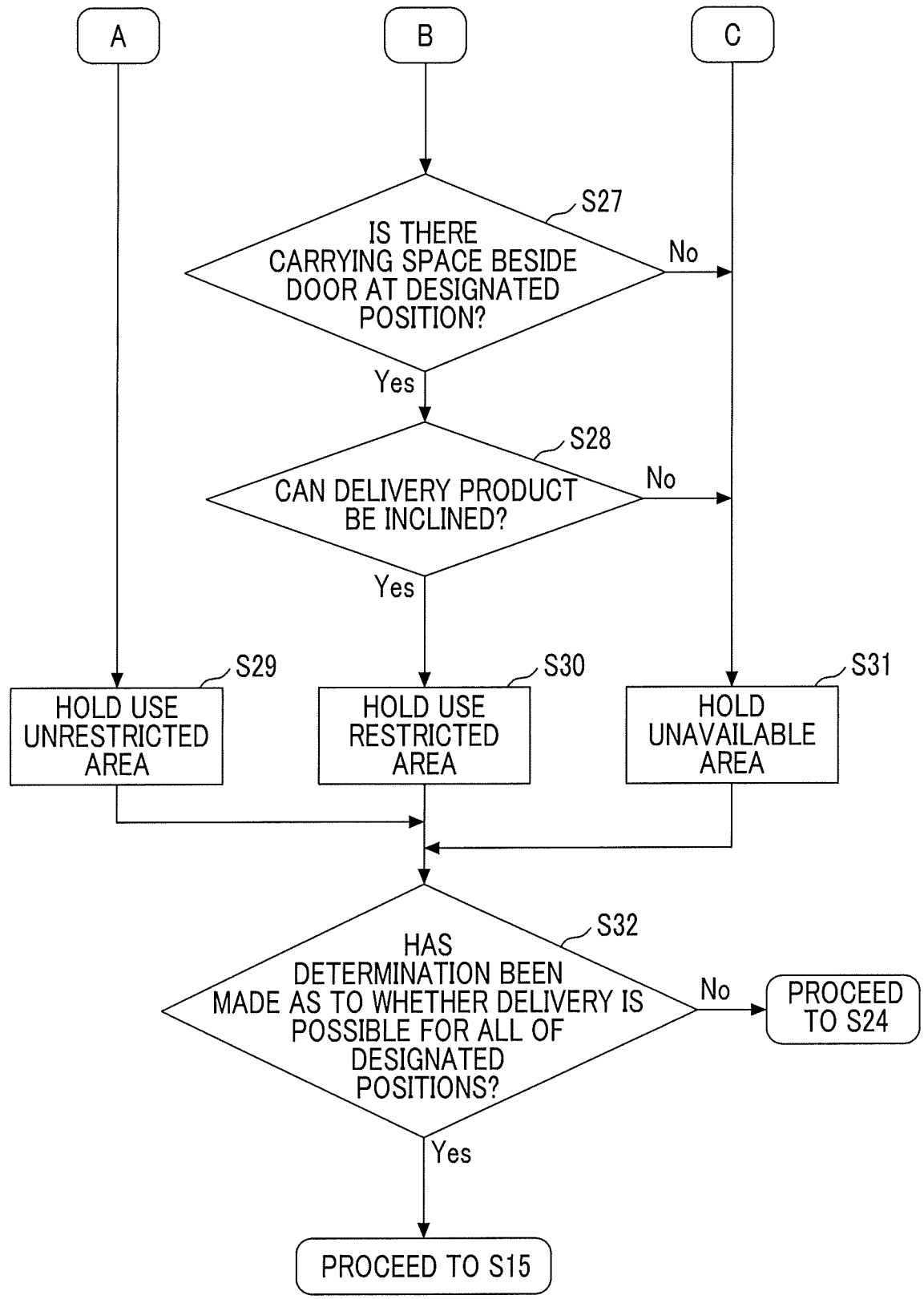
FIG. 10 is a flowchart showing an example of a detailed process of the process of S14.

Next, details of the process of S14 will be described. FIGS. 9 and 10 are flowcharts showing an example of a detailed process of S14. Processes in FIGS. 9 and 10 are performed on all of the vehicles 30 extracted in the process of S12.

In a process of S21 of the flowchart illustrated in FIG. 9, the sharing management server 10 acquires at least a vehicle type of the vehicle 30 and an opening and closing type of doors (including a package room door) from the vehicle identification information registered in the sharing management DB 200. Then, the sharing management server 10 acquires a designated position available for trunk sharing in the vehicle 30 from the place-of-use information registered in the sharing management DB 200 (S22). The available designated position includes a designation of the place of use such as a passenger seat, a rear seat on the passenger seat side, a rear seat on the driver seat side, a hood, or a trunk, and information on a storage space (dimensions such as a vertical width, a horizontal width, a depth of each place of use). The sharing management server 10 acquires at least information indicating the parking state of the vehicle 30 and the surroundings situation at the time of parking from the parking state information acquired in the process of S13 (S23). The information indicating the surroundings situation at the time of parking includes, for example, information indicating the presence or absence of an obstacle around the vehicle detected by the clearance sensors 30a to 30g illustrated in FIG. 5. The sharing management server 10 temporarily stores the information acquired in the processes of S21 to S23 and the information for specifying the requesting user in a predetermined area of the main storage device 12 in association with each other. The information associated with the information for specifying the requesting user is handed over to the process of S24.

In the processes from S24 to S32, a determination is made whether or not the delivery of the delivery product to the available area of the vehicle 30 is possible based on the size of the delivery product and the information including an indication indicating whether the delivery product can be inclined, which have been acquired in the process of S11, and various information acquired in the processes of S21 to S23. The determination as to whether or not the delivery of the delivery product is possible is made for each available designated position.

First, the sharing management server 10 can determine whether or not the delivery of delivery products to the place of use is possible based on the presence or absence of an obstacle acquired as the surroundings situation of the vehicle 30. For example, the delivery to the hood can be determined based on the presence or absence of an obstacle on the left side in the front of the vehicle and the right side in the front of the vehicle, the delivery to the passenger seat can be determined based on the presence or absence of an obstacle on the side of the passenger seat, the delivery to the rear seat on the passenger seat side can be determined based on the presence or absence of an obstacle on the left side behind the vehicle, the delivery to the rear seat on the driver seat side can be determined based on the presence or absence of an obstacle on the right side behind the vehicle, and the delivery to the package room can be determined based on the presence or absence of an obstacle on a center behind the vehicle. When the surroundings situation corresponding to each of the place of uses (designated positions) indicates the presence of the obstacle, a determination is made that the delivery is impossible, and when the surroundings situation indicates the absence of the obstacle, a determination is made that the delivery is possible. The sharing management server 10 determines whether or not the delivery product can be stored in the place of use determined to which the delivery is possible. Whether or not the delivery product can be stored in the place of use is determined through a comparison between a size of the delivery product and a size of the storage space of the place of use. When the delivery product can be stored, the sharing management server 10 holds the place of use as a use unrestricted area and proceeds to the process of S15. In addition, the sharing management server 10 holds the place of use to which the delivery is impossible as an unavailable area and proceeds to the process of S15.

However, the delivery to the place of use to which the delivery has been determined to be impossible can be possible according to a size or a weight of the delivery product, whether or not delivery product can be inclined, or the like in some cases. Similarly, for example, delivery via the inside of the vehicle 30 such as from the driver seat side to the passenger seat side can be possible in some cases. The sharing management server 10 according to the embodiment determines the place of use at the designated position and the presence or absence of a delivery product on a transportation route to the designated position based on the processes of S24 to S32.

In the process of S24, the sharing management server 10 determines whether there is a carrying-in space for the delivery product beside the door of the designated position. Here, "beside the door of the designated position" means, for example, a sufficient space around an opening and closing door corresponding to the place of use at which the delivery product is placed. For example, when the designated position is the passenger seat, a space around the passenger seat door corresponds to the designated position. Similarly, when the designated position is the rear seat on the passenger seat side, a rear seat door on the passenger seat side corresponds to the designated position, and when the designated position is the rear seat on the driver seat side, a rear seat door on the driver seat side corresponds to the designated position. When the designated position is the package room, a package room door corresponds to the designated position, and when the designated position is the hood, the hood itself corresponds to the designated position. However, when the hood is the designated position, "beside a door of the designated position" includes the passenger seat door and the driver seat door. This is because in opening and closing the hood, it is required to manipulate a manipulation part for opening and closing the hood provided in the vehicle 30. Therefore, in the process of S24, when the hood is the designated position, the presence or absence of the carrying-in space of the delivery product is determined for a space around the hood, a space around the passenger seat door, and a space around the driver seat door. The "sufficient space" refers to, for example, a space in which the delivery product can be placed at the designated position without being inclined in a state in which the door of the designated position is opened. As will be described below, when the clearance sensor is used, a state in which there is a space of at least 1 in or more beside the door of the designated position is illustrated.

In addition, in the process of S24, the determination as to "the presence or absence of a carrying-in space" can be made based on a detection range of a sensor that detects the presence or absence of an obstacle to be mounted on the vehicle 30. For example, when the detection range of the sensor that detects the presence or absence of an obstacle can be switched to a plurality of stages, the detection range immediately before stop is switched to 0.3 m, 0.6 m, and 1.0 m, and a distance to the obstacle can be measured. For example, when the presence of the obstacle is detected as "absence" in the detection range of 1.0 m ("Yes" in S24), the sharing management server 10 can determine that there is a carrying-in space of the delivery product beside the door of the designated position. When the presence of the obstacle is detected as "presence" in the detection range of 1.0 m ("No" in S24), the sharing management server 10 can determine that the carrying-in space of the delivery product beside the door of the designated position is not sufficient. For the distance between the vehicle 30 and the obstacle can be obtained, for example, when the vehicle 30 includes a radar or the like, a distance to the obstacle detected via the radar immediately before stop can be acquired. The sharing management server 10 may acquire, for example, the distance to the obstacle, which has been acquired via the radar, via the communication device 32. For example, when the distance between the vehicle 30 and the obstacle exceeds a predetermined threshold value (for example, 0.8 m), the sharing management server 10 can determine that there is a carrying-in space of the delivery product beside the door of the designated position. Further, when the distance between the vehicle 30 and the obstacle is equal to or smaller than the predetermined threshold value, the sharing management server 10 can determine that there is no enough carrying-in space of the delivery product beside the door of the designated position. Further, for example, when a surroundings image of the vehicle 30 in a parking state can be acquired via an around view monitor or the like, the distance between the vehicle 30 and the obstacle may be estimated from the captured image acquired immediately before stop. Further, when the parking lot includes a monitoring camera or the like that monitors a parking situation, the distance between the vehicle 30 and the obstacle can be estimated using a monitoring image captured via the monitoring camera. The sharing management server 10 can determine whether or not there is the carrying-in space of the delivery product beside the door of the designated position based on the distance estimated from the captured image.

In the process of S24, when the sharing management server 10 determines that there is a sufficient carrying-in space for carrying the delivery product beside the door of the designated position, the sharing management server 10 determines that the delivery to the designated position is possible, and proceeds to the process of S29. In the process of S29, the sharing management server 10 acquires the information on the place of use (designated position) in which a determination is made that there is a carrying-in space for carrying the delivery product in the beside the door in the process of S24, and holds the acquired place of use as a use unrestricted area. On the other hand, when the sharing management server 10 determines that there is no carrying-in space for carrying the delivery product beside the door of the designated position, the sharing management server 10 proceeds to the process of S25.

In the process of S25, the sharing management server 10 determines whether there is an opening and closing space for opening and closing the door beside the door of the designated position. This is because the delivery to the designated position is possible when the door opening and closing type or the delivery product permits inclination even when a determination is made that there is no enough carrying-in space beside the door of the designated position in the process of S24. Here, the determination as to "the presence or absence of the opening and closing space" is the same as the process of S24. For example, the sharing management server 10 can determine that there is an opening and closing space for opening and closing the door beside the door of the designated position when the presence of an obstacle is detected as "presence" in the detection range of a first threshold value (for example, 1.0 m) and the presence of an obstacle is detected as "absence" in the detection range of a second threshold value (for example, 0.3 m). Further, for example, when it is detected that "presence" is detected in the detection range of the second threshold value (for example, 0.3 m), the sharing management server 10 can determine that there is no opening and closing space for opening and closing the door beside the door of the designated position. When the sharing management server 10 determines that there is an opening and closing space for opening and closing the door beside the door of the designated position ("Yes" in S25), the sharing management server 10 proceeds to the process of S27 illustrated in FIG. 10. On the other hand, when the sharing management server 10 determines that there is no opening and closing space for opening and closing the door beside the door of the designated position ("No" in S25), the sharing management server 10 proceeds to the process of S26.

In the process of S25, the sharing management server 10 can consider an opening and closing type of the door corresponding to the designated position. For example, in a passenger seat door, a driver seat door, a rear seat door on the passenger seat side, a rear seat door on the driver seat side, and the like, a hinge type and a sliding type are illustrated as door opening and closing types. In addition, in the package room, a bouncing type in which the package room door is opened and closed in a vertical direction, a horizontal opening type in which a door is opened and closed from the left side to the right side, a double-opening type in which a door is opened and closed in a hinged manner in respective directions from the center to the left side and the right side are illustrated. The sharing management server 10 can store, for example, a threshold value table for determining the presence or absence of an opening and closing space corresponding to the door opening and closing type in the auxiliary storage device 13 or the like, and can determine an opening and closing space beside the door of the designated position based on the stored threshold value table. The threshold value as described above can be specified based on, for example, a specification described in a published catalog or the like. By considering the opening and closing type of the door corresponding to the designated position, an increase in the accuracy of determining whether or not the delivery of the delivery product to the vehicle 30 used for trunk sharing is possible can be expected.

In the process of S26, a determination is made whether or not carrying-in from the adjacent seat side in the vehicle of the designated position is possible. This is because in the process of S25, even when a determination is made that there is no opening and closing space for the door beside the door of the designated position, the delivery of the delivery product to the designated position is possible through the door on the adjacent seat side of the designated position. Here, the "the door adjacent to the designated position" refers to, for example, a "driver seat door" when the "passenger seat" is designated as the designated position. The same applies to a case where the "rear seat on the passenger seat side" and the "rear seat on the driver seat side" are designated as the designated positions. Since the determination as to "carrying-in" is the same as the process of S24, description thereof will be omitted. When the sharing management server 10 determines that carrying-in from the adjacent seat side of the designated position is possible ("Yes" in S26), the sharing management server 10 proceeds to the process of S29. In the process of S29, the sharing management server 10 acquires information on the place of use (the designated position) when the delivery of the delivery product from the adjacent seat side is possible. The sharing management server 10 holds the acquired place of use as the use unrestricted area. On the other hand, when the sharing management server 10 determines that carrying-in from the seat side adjacent to the designated position is impossible ("No" in S26), the sharing management server 10 proceeds to the process of S31 illustrated in FIG. 10.

Next, a flowchart illustrated in FIG. 10 will be described. In the process of S27, a determination is made whether or not there is a carrying space to the beside the door of the designated position. This is because that in the process of S26, when the door can be opened and closed, for example, the delivery product can be inclined and delivered to the designated position. The determination as to "the presence or absence of a carrying space" is performed similar to the process of S24 or the like. For example, when the presence of the obstacle is detected as "presence" in the detection range within the first threshold value (1.0 m) and "absence"

in the detection range within the second threshold value (0.6 m), a determined can be made that there is the carrying space to beside the door of the designated position. Further, for example, when the presence of the obstacle is detected as "presence" in a detection range that is a third threshold value (0.3 m), the sharing management server 10 can determine that there is no carrying space to beside the door of the designated position. When the sharing management server 10 determines that there is the carrying space to beside the door of the designated position ("Yes" in S27), the sharing management server 10 proceeds to a process of S28. On the other hand, when the sharing management server 10 determines that there is no opening and closing space for opening and closing the door beside the door of the designated position ("No" in S27), the sharing management server 10 proceeds to a process of S31.

In the process of S28, a determination is made whether or not inclination of the delivery product is permitted. This is because, in the process of S25, the delivery of the delivery product to the place of use in which a determination is made that there is the opening and closing space for opening and closing the door beside the door of the designated position is executed. The determination as to inclination of the delivery product is made based on the inclination possibility information acquired in the process of S11 in FIG. 8. When the inclination of the delivery product is not permitted ("No" in S28), the sharing management server 10 determines that the delivery to the designated position is impossible and proceeds to the process of S31. On the other hand, when inclination of the delivery product is permitted ("Yes" in S28), the sharing management server 10 determines that the delivery to the designated position is possible, and proceeds to the process of S30.

In the process of S28, the sharing management server 10 can take into consideration the size (the dimensions such as the vertical width, the horizontal width, and the depth) and the weight of the delivery product. For example, when each dimension indicating the size of the delivery product is equal to or smaller than a certain dimension threshold value and the weight is equal to or smaller than a certain weight threshold value, a determination can be made that the delivery to the designated position is possible, and otherwise, a determination can be made that the delivery to the designated position is impossible. For the dimension threshold value and the weight threshold value as described above, for example, a pick-up and delivery criterion of the pick-up and delivery user providing pick-up and delivery work can be adopted. Further, the sharing management server 10 may cause attributes such as a product type (food, drink, clothes, miscellaneous goods, household electric appliances, or the like) of the delivery product in the delivery determination, in addition to the size and weight of the delivery product.

In the process of S30, the sharing management server 10 acquires the information on the place of use (the designated position) in which the determination is made that the pick-up and delivery product is inclined in the carrying space in the process of S25. The sharing management server 10 holds the acquired place of use as a use restricted area. In the process of S31, the sharing management server 10 acquires the information on the place of use (designated position) in which "No" is determined in the processes of S25 and S26, and the information on the place of use in which "No" is determined in the process of S27. The sharing management server 10 holds the acquired place of use as an unavailable area. After the processes of S29, S30, and S31 end, the sharing management server 10 determines whether or not the delivery is possible is performed for all of the designated positions (S32). When a determination is made that the delivery is possible for all of the designated positions ("Yes" in S32), the processes illustrated in FIGS. 9 and 10 ends. On the other hand, when a determination is not made whether the delivery is possible for all of the designated positions ("No" in S32), the processes of S24 to S32 are repeated.

The sharing management server 10 may restrict the location of the obstacle that is a determination target of each process based on the parking state (the parking state in a frontward direction and the parking state in a rearward direction) of the vehicle 30 in the execution of the processes of S24 to S32. For example, when the obstacle is present in front of the vehicle and the parking state is a parking in a frontward direction, a determination may be made that the delivery to the hood in front is impossible. Further, when the designated position is the package room, the carrying-in space, the door opening and closing space, and the carrying space can be determined solely for the presence or absence of an obstacle on the left side behind the vehicle, a center behind the vehicle, and the right side behind the vehicle. For example, when an obstacle is present behind the vehicle and the parking state is parking in a rearward direction, a determination may be made that the delivery to the package room is impossible. Similarly, when the designated position is the hood, the carrying-in space, the door opening and closing space, and the carrying space can be determined solely for the presence or absence of an obstacle on the left side in front of the vehicle, the right side in front of the vehicle, the side of the passenger seat, and the side of the driver seat. In the sharing management server 10, considering the parking state (the parking state in a frontward direction and the parking state in a rearward direction) of the vehicle 30, a location of the obstacle that is a determination target of each process is restricted, and thereby, a load on the process is reduced.

The processes illustrated in FIGS. 8 to 10 are also applied to a case where the vehicle 30 is designated as a pick-up destination of a pick-up product. The requesting user, for example, accesses the sharing management server 10 through the assistance application of the requester terminal 40 and requests search for the sharing management information of the vehicle 30 stored in the sharing management DB 200. For example, the requesting user inputs information such as an address of pick-up destination of a pick-up product, date of use, time period, time of use, place of use, size of a delivery product, and inclination possibility information, and requests the sharing management server 10 to perform search. The sharing management server 10 that has received the request may cause the display device of the requester terminal 40 to display a screen for designating a size of the delivery product, and cause dimensions such as a vertical width, a horizontal width, and a depth or inclination possibility information to be input, as will be described below. The sharing management server 10, for example, searches for an available vehicle 30 from the sharing management DB 200 based on the above information, and selects candidates for date of use, time period, and place of use available as a pick-up and delivery destination of the pick-up and delivery product from the use state of trunk sharing of the vehicles 30 that has been searched for. In the sharing management server 10, the processes illustrated in FIG. 8 to FIG. 10 are executed at the time of the above selection, and the date of use, the time period, and the place of use available according to the parking state and the surroundings situation of the vehicle 30 are specified. The requesting user, for example, registers the information notified via the sharing management server 10 in the external server 60B of the pick-up and delivery user providing the pick-up and delivery service. In the external server 60B, the vehicle 30 and the place of use specified by the sharing management server 10 are registered together with a desired pick-up date and a desired pick-up time period. The external server 60B transmits a notification indicating that pick-up of the pick-up product has been received to the requesting user based on a telephone number, a mail address, or the like of the requester terminal 40. The requesting user having received the notification from the pick-up and delivery user registers a pick-up date or time period selected for the pick-up destination of the pick-up product, a package attribute of the pick-up product, and the like in the sharing management server 10 through the assistance application. The sharing management server 10 registers date of use, time period of the pick-up destination, product attribute, form of use (pick-up destination), and identification information of the requesting user in the sharing management information of the vehicle 30 to be used for trunk sharing.

However, the sharing management server 10 and the external server 60B managed by the pick-up and delivery user may cooperate with each other to provide the above processing procedure. For example, when the requesting user accessing the external server 60B designates an address of the pick-up destination of the pick-up product, the external server 60B accesses the sharing management server 10 and requests specifying of requester information of the requesting user and search for a vacant schedule of the vehicle 30 to be used by the requesting user. The sharing management server 10 executes the processes illustrated in FIGS. 8 to 10 and specifies a day, a time period, and a place of use available according to the parking state and surroundings situation of the vehicle 30 available for trunk sharing. The external server 60B adjusts a pick-up and delivery period of the vacant schedule of the vehicle 30 specified by the sharing management server 10 and the pick-up and delivery schedule managed by the external server 60B to determine a pick-up date and a pick-up time period of the pick-up product of the requesting user, and registers the pick-up date and the pick-up time period in the pick-up schedule or the like. The external server 60B notifies the sharing management server 10 and the requester terminal 40 of a pick-up date and a pick-up time period of the pick-up product determined for the requesting user together with a pick-up and delivery company name (a pick-up and delivery user name) and the like. The sharing management server 10 may register information on a pick-up date, a pick-up time period, a pick-up and delivery user, a requesting user, or the like of the pick-up product of which the external server 60B has been notified, in the sharing management information of the sharing management DB 200.

Example of Notification of Delivery Possibility Information

Next, an example of a screen of which the requester terminal 40 is notified according to the process of FIG. 8 will be described. Screens illustrated in FIGS. 11 to 14 are examples of a display screen that is displayed on the display device of the requester terminal 40. The display screens illustrated in FIGS. 11 to 14 are presented to the requesting user according to the progress of the process illustrated in FIG. 8.

Figure 11:
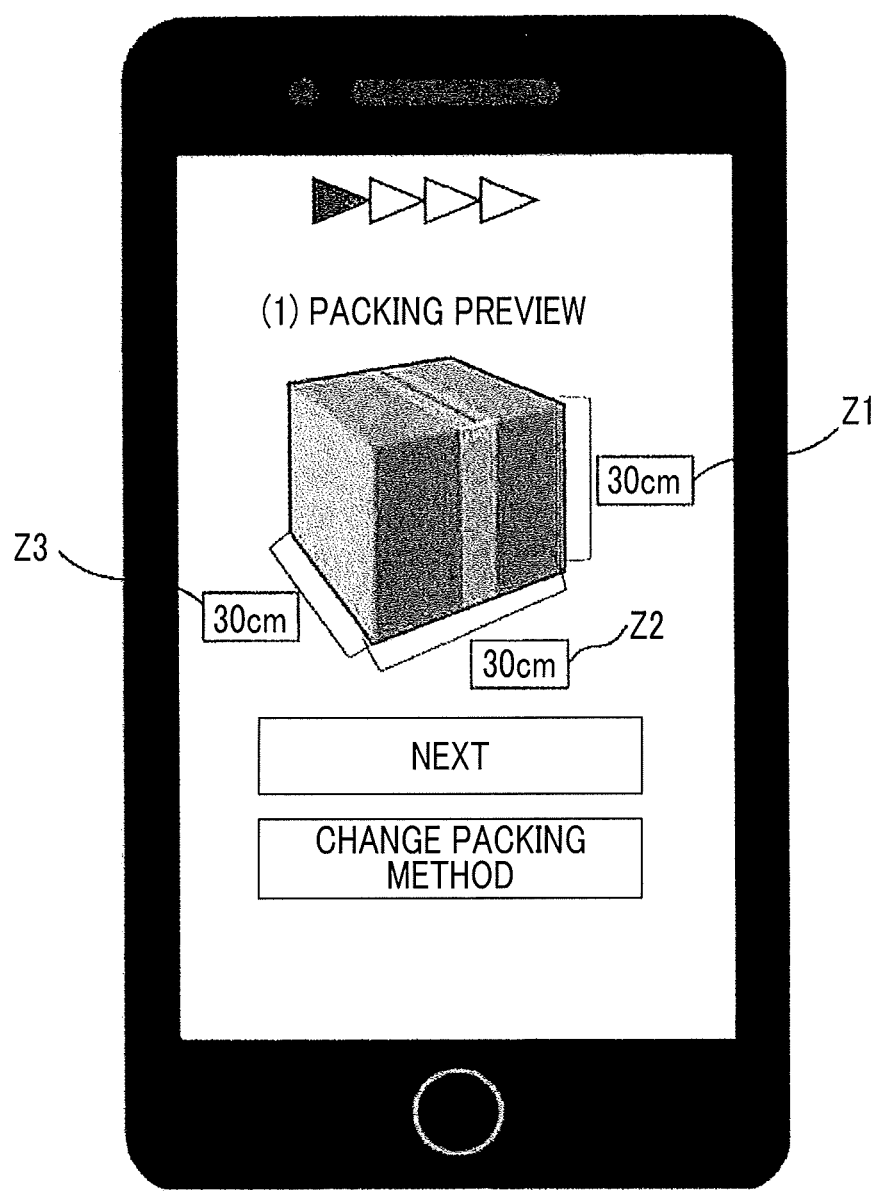
FIG. 11 illustrates an example of a display screen notified to a requester terminal.

FIG. 11 illustrates an example of a screen for designating a size of the pick-up and delivery product. The sharing management server 10 displays, for example, a display screen illustrated in FIG. 11 on the display device of the requester terminal 40 at the time of reception of the request for use of the pick-up and delivery destination from the requesting user. As illustrated in FIG. 11, the pick-up and delivery product is drawn as a three-dimensional packing preview, and display portions for designating the size of the pick-up and delivery product are drawn as graphical user interface (GUI) parts. In the example of FIG. 11, a GUI part Z1 for designating a vertical width dimension of the pick-up and delivery product, a GUI part Z2 for designating a horizontal width dimension, and a GUI part Z3 for designating a depth dimension are displayed together with the three-dimensional packing preview. The requesting user, for example, superimposes a manipulation finger or the like on an area on the screen on which the GUI part Z1, the GUI part Z2, and the GUI part Z3 are displayed and performs a tapping manipulation to input a dimension value. The sharing management server 10 receives each dimension value of the pick-up and delivery product input via the display screen illustrated in FIG. 11. The sharing management server 10 may receive a weight, inclination possibility information, or the like together with the size of the delivery product illustrated in FIG. 11.

Figure 12:
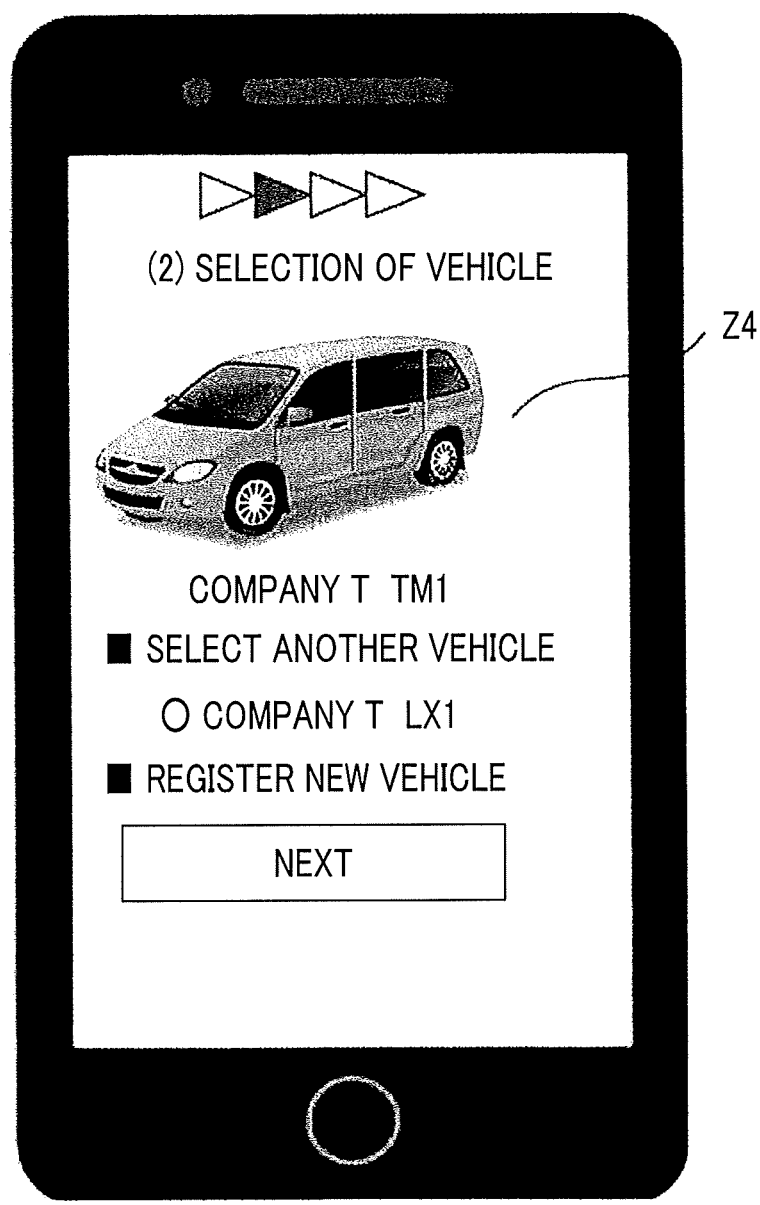
FIG. 12 illustrates an example of a display screen notified to the requester terminal.

FIG. 12 illustrates an example of a screen for presenting a vehicle 30 that is available for trunk sharing. The sharing management server 10 displays, for example, a display screen illustrated in FIG. 12 on the display device of the requester terminal 40 at the time of notification of delivery possibility information for each vehicle (the process of S15 in FIG. 8). As illustrated in FIG. 12, the vehicle 30 available as a pick-up and delivery destination of the pick-up and delivery product is drawn as a three-dimensional preview image Z4, and options for other vehicles 30 are displayed. The delivery possibility information for each place of use determined according to the parking state or the surroundings situation at the time of parking in the processes of FIGS. 9 and 10 is associated with the vehicle 30 displayed on the requester terminal 40. For example, the requesting user performs a tapping manipulation according to content of the display displayed on the display device, to select the vehicle 30 to be used as the pick-up and delivery destination. The preview image Z4 of the vehicle 30 displayed on the display device of the requester terminal 40 may be, for example, a captured image of the vehicle 30 published in a catalog, a Web, or the like. The preview image Z4 may be an object from which at least a type such as a sedan or minivan, color, or the like of the vehicle 30 related to the use of trunk sharing can be visually recognized.

Figure 13:
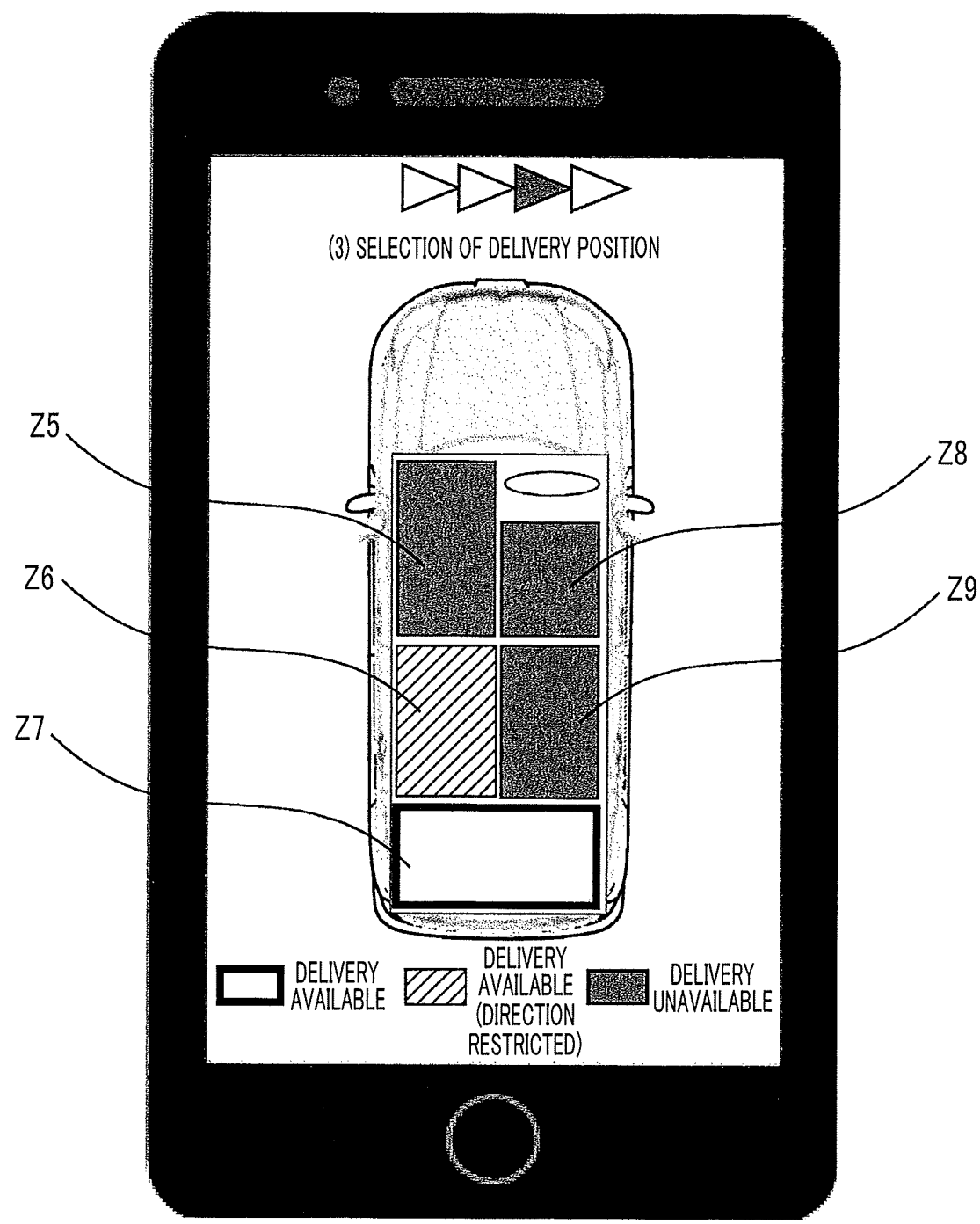
FIG. 13 illustrates an example of a display screen notified to the requester terminal.

FIG. 13 illustrates an example of a screen for presenting delivery possibility information. In FIG. 13, information indicating delivery possibility for each place of use according to a model of the vehicle 30 or the like is illustrated. In the vehicle 30 illustrated in FIG. 13, five places including a driver seat, a passenger seat, a rear seat on the driver seat side, a rear seat on the passenger seat side, and a trunk (a package room) are illustrated as places of use of the vehicle 30. The screen illustrated in FIG. 13 is displayed after selection of the vehicle 30 to be used as pick-up and delivery destination on the screen illustrated in FIG. 12. As illustrated in FIG. 13, a placement destination of the delivery product of which the delivery to each place of use has been determined is presented according to the parking state and the surroundings situation (presence or absence of an obstacle) of the vehicle 30 on the screen on which the delivery possibility information is presented. Even when the vehicle is used as a pick-up destination of a pick-up product, the same display screen is displayed on the display device of the requester terminal 40. In FIG. 13, for example, a driver seat Z8, a passenger seat Z5, and a rear seat on the driver seat side Z9 indicate unavailable areas to which the delivery is determined to be impossible in the processes illustrated in FIGS. 9 and 10. Similarly, a rear seat on the passenger seat side Z6 hatched with lines oblique to upper right indicates a use restricted area to which the delivery of the delivery product is determined to be restricted according to the parking state of the vehicle 30, whether or not the delivery product is inclined, and the like. In addition, a package room Z7 surrounded by a bold frame indicates a use unrestricted area in which the delivery of the delivery product is determined to be possible with no restrictions. As illustrated in FIG. 13, the place of use determined to be delivery impossible, delivery possible with restrictions, and delivery possible are distinguished by a color type, hatching, or the like and displayed on the display device of the requester terminal 40. The requesting user selects a place of use available as a pick-up and delivery destination of the pick-up and delivery product based on the delivery possibility information presented on the display device of the requester terminal 40.

Figure 14:
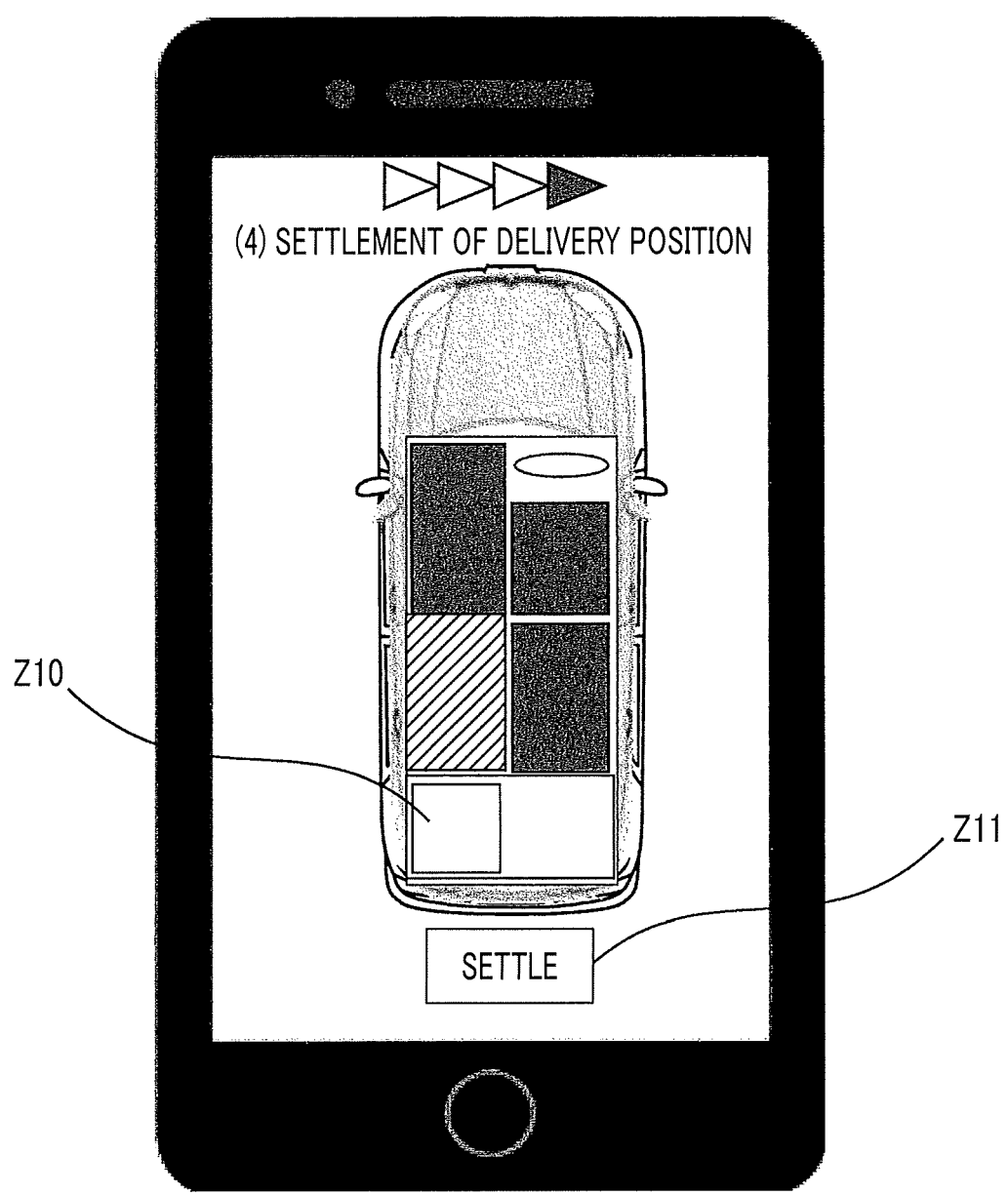
FIG. 14 illustrates an example of a display screen notified to the requester terminal.

FIG. 14 illustrates an example of a screen for settling a placement position of a pick-up and delivery product. When the process proceeds according to the display screen described with reference to FIG. 13, a screen for settling the placement position illustrated in FIG. 14 is displayed on the display device of the requester terminal 40. Based on the presented delivery possibility information, the requesting user selecting the package room as a pick-up and delivery destination of the pick-up and delivery product, for example, superimposes a manipulation finger or the like on the display area of the package room in the display screen illustrated in FIG. 14 and performs a tapping manipulation. As illustrated in FIG. 14, a display part Z10 indicating the pick-up and delivery product is displayed at a manipulation position at which the tapping manipulation has been performed. The requesting user manipulates a manipulation button Z11 indicating a settlement operation displayed on the display screen to settle the pick-up and delivery destination of the pick-up and delivery product. The requesting user, for example, superimposes a manipulation finger or the like on a display position of "Settle" of the manipulation button Z11, performs a tapping manipulation to settle the place of use in the vehicle 30.

The requester terminal 40, for example, transmits the pick-up and delivery destination (a placement position) of the settled pick-up and delivery product to the sharing management server 10 using the manipulation input with respect to the manipulation button Z11 in the screen displayed on the display device as a trigger. As described with reference to FIG. 8, in the process of S16, the sharing management server 10 receives the settlement information of the delivery destination transmitted from the requester terminal 40 and acquires the settlement information as the pick-up and delivery destination information indicating the delivery destination of the delivery product. The pick-up and delivery destination information includes a delivery date, a delivery time period, a place of use, information for specifying the vehicle 30, and information for specifying the requesting user. The pick-up and delivery destination information of the pick-up and delivery product received by the sharing management server 10 is registered in the sharing management information of the sharing management DB 200.

Process after Settlement of Pick-Up and Delivery Destination

After the delivery destination of the purchased product is settled, the parking state and the surroundings situation of the vehicle 30 may change in a period until the purchased product is delivered. Examples of such a case include a case where the vehicle 30 is moved during the above period and a case where an order for purchased product has been performed by a requesting user other than the driver during the movement of the vehicle 30. Such a situation may also occur, for example, when the vehicle 30 is used as a pick-up destination of the pick-up product. In a case where the parking state and the surroundings situation of the vehicle 30 change after the pick-up and delivery destination is settled, for example, a situation in which pick-up and delivery work for the place of use in the vehicle 30 to which pick-up and delivery of the pick-up and delivery product is determined to be possible is not performed may occur. In the sharing management server 10 according to the embodiment, when there is a reservation for use of trunk sharing at the time of parking of the vehicle 30, the processes illustrated in FIGS. 8 to 10 are executed again and a determination is made as to whether or not pick-up and delivery to the reserved place of use is possible.

Figure 15:
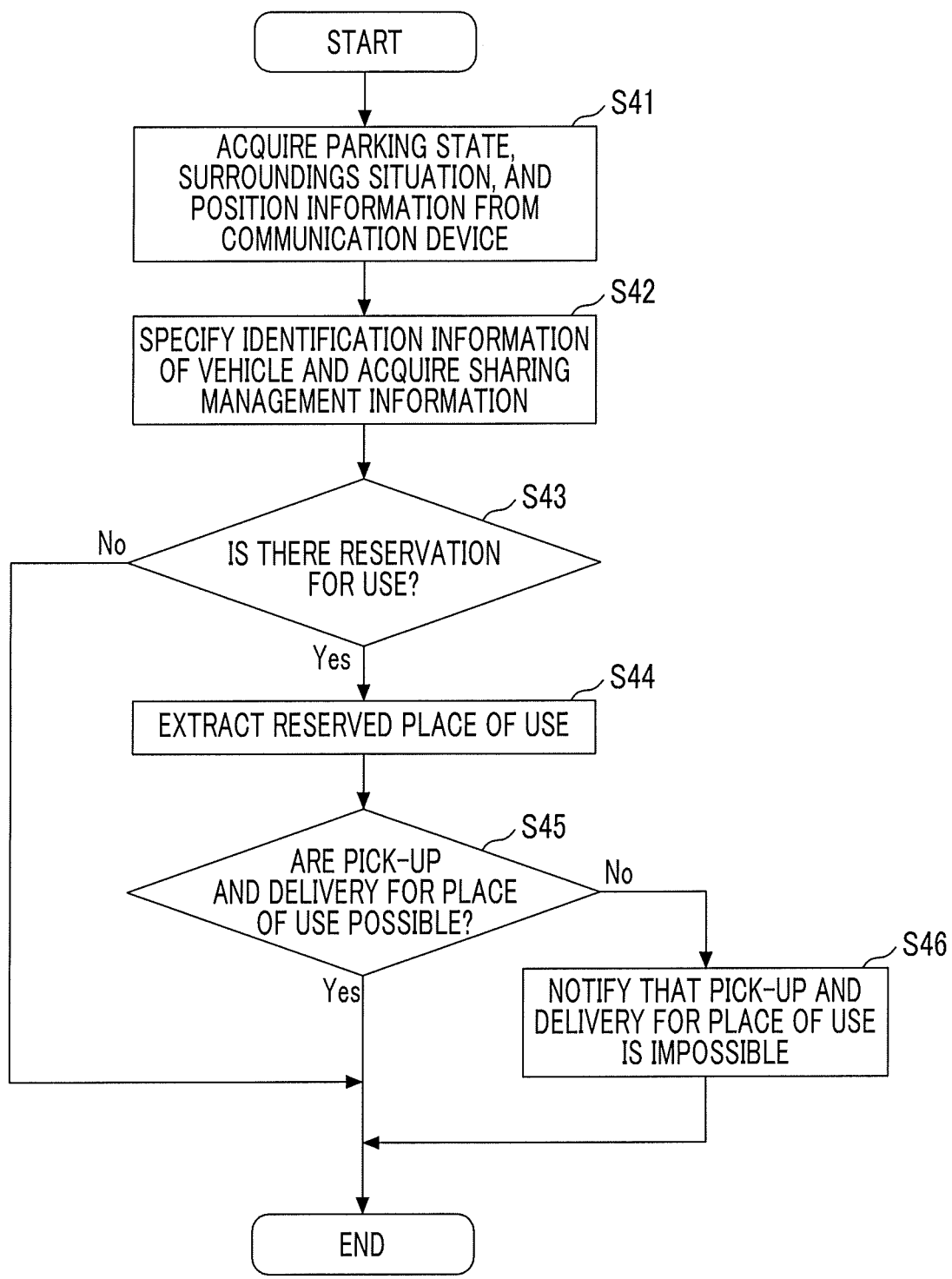
FIG. 15 illustrates a flowchart showing an example of a process of determining whether or not pick-up and delivery to a reserved place of use is possible.

FIG. 15 is a flowchart showing an example of a process of determining whether or not pick-up and delivery to the reserved place of use is possible. In the flowchart of FIG. 15, start of the process is illustrated as a time of ACC-OFF of the vehicle 30 after movement or a time of parking at the designated place. The sharing management server 10 acquires the parking state, the surroundings situation, the position information, and the like of the vehicle 30 notified via the communication device 32 (S41). The acquired information is temporarily stored in a predetermined area of the main storage device 12 in association with the received time information and the identification information of the communication device 32, for example.

The sharing management server 10 specifies the identification information of the corresponding vehicle 30 from the identification information of the communication device 32 and acquires the sharing management information associated with the vehicle 30 from the sharing management DB 200 (S42). The sharing management server 10 determines whether or not there is a reservation for use of trunk sharing in the sharing management information on the vehicle 30 (S43). Specifically, the sharing management server 10 determines that there is a reservation for use, for example, when there is "not completed" in a status-of-use field of the sharing management information. Further, for example, when there is no "not completed" in the status-of-use field of the sharing management information, the sharing management server 10 determines that there is no reservation for use.

When the sharing management server 10 determines that there is a reservation for use ("Yes" in S43), the sharing management server 10 proceeds to process of S44. On the other hand, when the sharing management server 10 determines that there is no reservation for use ("No" in S43), the process illustrated in FIG. 15 ends. In the process of S44, the sharing management server 10 extracts the place of use of which reservation as a pick-up and delivery destination has been settled from a place-of-use field corresponding to "incompletion" in the sharing management information. The sharing management server 10 determines whether or not pick-up and delivery for the extracted place of use are possible (S45). Specifically, based on the parking state, the surroundings situation, and the position information acquired in the process of S41, the sharing management server 10 sets the place of use extracted in the process of S44 as a processing target and executes the process of S14 of FIG. 8, that is, the processes of FIGS. 9 and 10. As an example, when the place of use is a "passenger seat", a determination is made whether or not pick-up and delivery limited to the passenger seat is possible based on a size, weight, and inclination possibility information of the pick-up and delivery product, and the parking state, the surroundings situation, and the position information acquired in the process of S41. However, the "passenger seat" has already been determined to be deliverable (a use restricted area or no use restricted area). Therefore, in the process of S45, a determination is again made whether or not "passenger seat" corresponds to the "unavailable area" of the process of S31.

Referring back to FIG. 15, when the sharing management server 10 determines that pick-up and delivery for the place of use for which reservation has been settled is impossible based on the parking state, the surroundings situation, and the position information acquired in the process of S41 ("No" in S45), the sharing management server 10 proceeds to a process of S46. On the other hand, when the sharing management server 10 determines that the pick-up and delivery for the place of use for which reservation has been settled is possible based on the parking state, the surroundings situation, and the position information acquired in the process of S41 ("Yes" in S45), the process illustrated in FIG. 15 ends.

In the process of S46, the sharing management server 10 notifies that the pick-up and delivery for the place of use is impossible. For example, the sharing management server 10 specifies the requesting user who is reserving the place of use from the sharing management information acquired in the process of S42. The sharing management server 10 notifies, for example, the requester terminal 40 of the specified requesting user that the pick-up and delivery for the reserved place of use is difficult. For the requesting user who has received the notification, for example, search for another vehicle 30 available as a pick-up and delivery destination of the pick-up and delivery product and pick-up product is performed through the assistance application. In addition, the sharing management server 10 notifies the cooperating external servers 60A, 60B that the pick-up and delivery for the reserved place of use become impossible. The external servers 60A, 60B notify, for example, the contact information of the requesting user registered in the respective servers that the pick-up and delivery for the reserved place of use of the vehicle 30 become impossible. In the process of S46, the sharing management server 10 may notify that the pick-up and delivery for the reserved place of use is difficult through, for example, a display panel of a car navigation device connected to the communication device 32 via the in-vehicle network. Further, when the sharing management server 10 determines that the pick-up and delivery for the place of use is impossible according to the parking state acquired in the process of S41, the sharing management server 10 may notify of a message for prompting change from the parking state in a frontward direction to the parking state in a rearward direction through, for example, the display panel of the car navigation device. Alternatively, the sharing management server 10 may notify the requester terminal 40 of the requesting user who is a provider of the vehicle 30 of the message for prompting change from the parking state in a frontward direction to the parking state in a rearward direction. After the process of S46, the process illustrated in FIG. 15 ends. The processes of S41 to S46 executed by the sharing management server 10 of the trunk sharing system 1 corresponds to an example of management means for determining pick-up and delivery of the pick-up and delivery product to an area which is a pick-up and delivery destination is possible based on the state information and the package attribute information after reception of the reservation for use.

Figure 16:
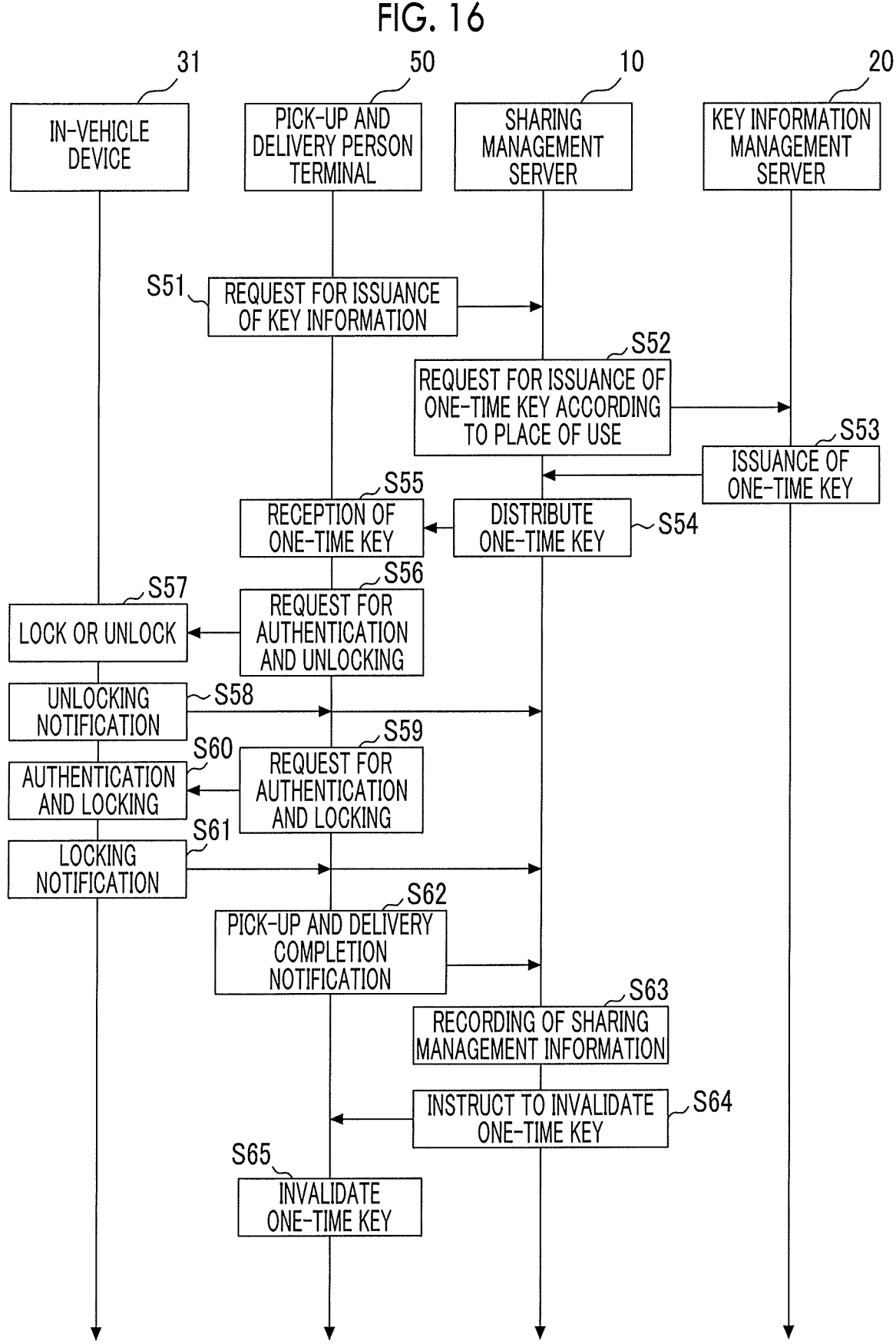
FIG. 16 is a sequence diagram illustrating an example of a flow of a pick-up and delivery process.

Next, a flow of the pick-up and delivery process in the trunk sharing system 1 will be described. FIG. 16 is a sequence diagram illustrating an example of a flow of the pick-up and delivery process for the vehicle 30 for which the sharing management server 10 has determined whether the pick-up and delivery of the pick-up and delivery product is possible according to the parking state, the surroundings situation, and the like. In FIG. 16, a form in which the key information management server 20 that has received a key information issuance request from the sharing management server 10 issues the key information is illustrated. However, for the issuance of the key information, the sharing management server 10 may include a processing function of the key information management server 20, and issue the key information to the pick-up and delivery person terminal 50. Further, in FIG. 16, it is assumed that the pick-up and delivery person terminal 50 is notified of information (a vehicle manufacturer name, a vehicle type, a color or vehicle image, a car number, or the like) for specifying the vehicle 30 to be used as the pick-up and delivery destination, parking position information (a parking lot address, a parking position, image information of the parking position, or the like), and information indicating the place of use.

For example, the pick-up and delivery person reaches the parking position of the vehicle 30 designated as the pick-up and delivery destination while confirming an address or the like indicated by the parking position information on a car navigation or the like at the designated delivery date and time. When the pick-up and delivery person specifies the vehicle 30 designated as a pick-up and delivery destination from the information for specifying the vehicle 30, the pick-up and delivery person terminal 50 notifies the sharing management server 10 of the request for issuance of the key information for unlocking or locking the place of use at which the pick-up and delivery product has been placed through the assistance application installed in the pick-up and delivery person terminal 50 (S51). The key information issuance request of which the pick-up and delivery person terminal 50 has notified includes at least information for specifying the vehicle 30 designated as the delivery destination. The pick-up and delivery person, for example, may request the sharing management server 10 to notify the latitude and longitude of the parking position of the vehicle 30 through the assistance application of the pick-up and delivery person terminal 50. The sharing management server 10, for example, requests the communication device 32 to notify the position information. The communication device 32 having received the position information notification request acquires position information (latitude and longitude) of the parking position at which the subject vehicle is parked from a GPS unit or the like mounted on the vehicle 30, and responses the sharing management server 10 with the acquired position information. The sharing management server 10 acquires responded position information (latitude and longitude) of the vehicle 30 from the communication device 32 and transmits the position information to the pick-up and delivery person terminal 50. For example, the pick-up and delivery person can reach the vehicle 30 designated as the pick-up and delivery destination while referring to the parking position displayed on a map screen based on the position information.

The sharing management server 10 receives the request for issuance of the key information from the pick-up and delivery person terminal 50 and requests the key information management server 20 to issue a one-time key. The sharing management server 10 specifies the vehicle identification information based on the information for specifying the vehicle 30 included in the key information issuance request from the pick-up and delivery person terminal 50. The sharing management server 10 acquires the place of use stored in the place-of-use field as the placement position of the pick-up and delivery product based on the sharing management information corresponding to the vehicle 30. The sharing management server 10 requests the key information management server 20 to issue a one-time key including information for specifying the place of use and vehicle identification information (S52).

The key information management server 20 receives the request for issuance of a one-time key transmitted from the sharing management server 10, and issues key information (one-time key) (S53). The key information management server 20 issues key information for causing the pick-up and delivery person terminal 50 to function as a temporary electronic key based on at least the vehicle identification information of the vehicle 30, the information for specifying the place of use, and the information on a time at which the issuance request has been received, which are included in the one-time key issuance request. The key information management server 20 can issue the key information corresponding to the place of use (a hood, a passenger seat, a rear seat on the passenger seat side, a rear seat on the driver seat side, or a package room) designated as the destination of the pick-up and delivery product. The issuance of the key information corresponding to the place of use as described above may be provided with respect to the sharing management server 10 in advance.

When the key information management server 20 delivers the issued key information as the one-time key to the sharing management server 10, the sharing management server 10 sends the one-time key delivered from the key information management server 20 to the pick-up and delivery person terminal 50 (S54). The pick-up and delivery person terminal 50 receives the one-time key distributed from the sharing management server 10 and temporarily stores the one-time key in a predetermined area of the main storage device 52 (S55). The one-time key may be directly issued from the key information management server 20 to the pick-up and delivery person terminal 50.

The pick-up and delivery person executes the assistance application to operate the pick-up and delivery person terminal 50 which has received the key information as a temporary electronic key for locking or unlocking the place of use at which the pick-up and delivery product has been placed, and transmits an unlocking request (S56). The key unit 80 of the in-vehicle device 31 mounted on the vehicle 30 executes authentication according to the unlocking request from the pick-up and delivery person terminal 50. When the authentication is successful, the key unit 80 transmits the locking and unlocking signal and the key ID to the locking and unlocking device 90. An unlocking process is performed by the locking and unlocking device 90 according to the locking and unlocking signal and the key ID transmitted from the key unit 80, and for example, a door according to the place of use of the vehicle 30 is unlocked (S57). The in-vehicle device 31 notifies the pick-up and delivery person terminal 50 and the sharing management server 10 of unlocking (S58). The sharing management server 10 may record the time information at which the unlocking notification has been received, in the sharing management information on the vehicle 30. The pick-up and delivery person opens or closes, for example, the unlocked door of the vehicle 30, performs placement of a delivery product in the place of use or pick-up of a pick-up product placed in the place of use, and performs locking (S59). In locking, the process as the process described in S57 and S58 is performed (S60 and S61). The pick-up and delivery person, for example, transmits a pick-up and delivery completion notification to the sharing management server 10 via the pick-up and delivery person terminal 50 (S62). In the sharing management server 10, for example, time information at which the pick-up and delivery completion notification has been received is recorded in the sharing management information of the vehicle 30, and "Completed" is recorded in a use completion and incompletion status field (S63).

The sharing management server 10 invalidates the one-time key held in the pick-up and delivery person terminal 50 (S64). The sharing management server 10, for example, performs an instruction to erase the key information held in the pick-up and delivery person terminal 50 using recording in the sharing management information according to the pick-up and delivery completion notification as a trigger. In the pick-up and delivery person terminal 50, for example, the key information of the one-time key temporarily held in the predetermined area of the main storage device 52 is erased through a process of the assistance application which has received the instruction to erase the key information (S65). The pick-up and delivery person terminal 50 may erase the key information of the one-time key temporarily held in the predetermined area of the main storage device 52 through execution of the assistance application triggered by the delivery completion notification.

Figure 17:
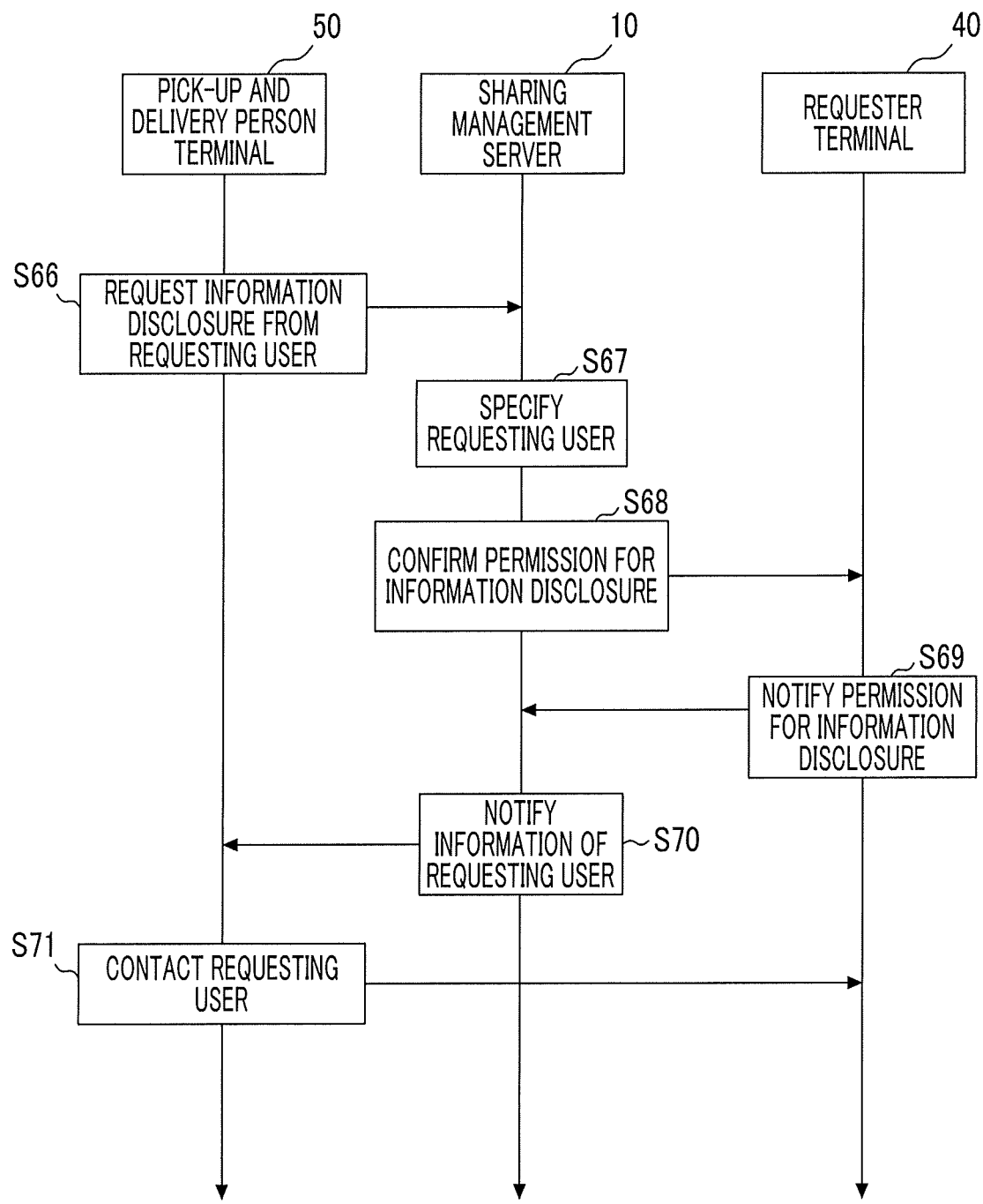
FIG. 17 is a sequence diagram illustrating an example of a flow of a pick-up and delivery process.

In FIG. 16, the flow of the process related to the placement of the delivery product at the place of use at which pick-up and delivery of the pick-up and delivery product are determined to be possible or pick-up of a pick-up product placed at the place of use has been described. However, even in a state in which a determination is made that delivery is possible from the parking state of the vehicle 30 or the surroundings situation at the time of parking, pick-up and delivery to the parked vehicle 30 may be difficult. For example, a case where when the place of use is designated as a "passenger seat" and the pick-up and delivery person reaches the parking lot of the vehicle 30, a determination is made that the passenger seat door cannot be opened from the situation on the spot is illustrated. FIG. 17 is a sequence diagram illustrating an example of a flow of a process that is performed between the pick-up and delivery person terminal 50 and the sharing management server 10 in the case described above. The pick-up and delivery person reaching the parking position of the vehicle 30 designated as a pick-up and delivery destination determines that pick-up and delivery of the pick-up product to the place of use is not impossible, for example, through visual inspection. The pick-up and delivery person notifies the sharing management server 10 of an information disclosure request of the requesting user who has requested pick-up and delivery of the pick-up and delivery product through the assistance application of the pick-up and delivery person terminal 50 (S66). The information disclosure request of the requesting user includes information for specifying the vehicle 30. When the sharing management server 10 receives the information disclosure request of the requesting user from the pick-up and delivery person terminal 50, the sharing management server 10 specifies the vehicle identification information based on the information for specifying the vehicle 30. The sharing management server 10 specifies the user ID of the requesting user based on the sharing management information corresponding to the vehicle 30 (S67). The sharing management server 10 searches for the requester registration information based on the user ID and acquires the name of the requesting user, the telephone number of the requester terminal 40, and the like. The sharing management server 10 notifies the requester terminal 40 that there has been the information disclosure request through the assistance application, and performs confirmation of permission for information disclosure (S68). When the sharing management server 10 receives the notification of permission for information disclosure from the requester terminal 40, the sharing management server 10 notifies the pick-up and delivery person terminal 50 of information such as a name of the requesting user and a telephone number of the requester terminal 40 acquired from the requester registration information (S69 and S70). Based on the information on the requesting user disclosed from the sharing management server 10, the pick-up and delivery person notifies that pick-up and delivery to the vehicle 30 designated as a pick-up and delivery destination of the pick-up and delivery product is difficult (S71).

In addition, the surroundings situation of the vehicle 30 to which the pick-up and delivery of a pick-up and delivery product have been determined to be possible may change due to external factors. For example, in a state in which another vehicle is parked on the passenger seat side of the vehicle 30, pick-up and delivery to the vehicle 30 of which the "passenger seat" has been designated as the pick-up and delivery destination may be difficult. FIG. 18 is a sequence diagram illustrating an example of the flow of the process to be performed among the pick-up and delivery person terminal 50, the sharing management server 10, and the communication device 32 in order to cope with the case described above. The pick-up and delivery person notifies the sharing management server 10 of a request for confirmation of the surroundings situation of the vehicle 30 before the pick-up and delivery person reaches the parking position of the vehicle 30 designated as the pick-up and delivery destination at a delivery date and time (S72). The request for confirmation of the surroundings situation includes information for specifying the vehicle 30. The sharing management server 10 receives the request for confirmation of the surroundings situation from the pick-up and delivery person terminal 50 (S73). The sharing management server 10 specifies the vehicle identification information based on the information for specifying the vehicle 30, specifies the communication device 32 mounted on the vehicle 30 based on the sharing management information corresponding to the vehicle 30, and performs a request for notification of the surroundings situation (S74). Here, the process of S73 executed by the sharing management server 10 of the trunk sharing system 1 corresponds to an example of means for receiving a state information acquisition request. The communication device 32, for example, acquires the presence or absence of an obstacle present around the vehicle 30 detected through the clearance sensors 30a to 30g using the reception of the request for notification of the surroundings situation as a trigger, and notifies the sharing management server 10 of the presence or absence of an obstacle (S75). The sharing management server 10 temporarily stores the surroundings situation of the vehicle 30 acquired via the communication device 32 in a predetermined area of the main storage device 12 in association with the received time information. The sharing management server 10 notifies the pick-up and delivery person terminal 50 of the presence or absence of an obstacle present around the vehicle 30 detected through the clearance sensors 30a to 30g as the surroundings situation of the vehicle 30 (S76). The pick-up and delivery person, for example, browses the surroundings situation of the vehicle 30 displayed on the display device through the assistance application and estimates whether or not work of pick-up and delivery to the place of use designated as the pick-up and delivery destination is possible.

The sharing management server 10 may execute a process of determining whether or not the delivery to the reserved place of use illustrated in FIG. 15 is possible based on the received surroundings situation of the vehicle 30 and the place of use designated as the pick-up and delivery destination. By executing the process illustrated in FIG. 15, it is possible to specify, for example, whether or not the place of use designated as the pick-up and delivery destination corresponds to the "unavailable area". In the process of S76, the sharing management server 10 can notify the pick-up and delivery person terminal 50 of the surroundings situation of the vehicle 30 acquired via the communication device 32, together with the result of the process illustrated in FIG. 15. Here, the place of use in the vehicle 30 designated as the pick-up and delivery destination corresponds to the "area serving as the pick-up and delivery destination". Therefore, the process of S76 executed by the sharing management server 10 of the trunk sharing system 1 corresponds to an example of management means for determining whether or not the pick-up and delivery of the pick-up and delivery product to an area serving as the pick-up and delivery destination is impossible based on the state information acquired in response to the request for acquisition and the package attribute information of the pick-up and delivery product the use of which has been reserved.

The flows of the processes illustrated in FIGS. 16 to 18 are similarly applied to the pick-up and delivery product stored in the place of use or the requester terminal 40 of the requesting user performing placement of the pick-up and delivery product in the place of use.

As described above, the sharing management server 10 according to the embodiment can determine whether or not pick-up and delivery of the pick-up and delivery product to each place of use is possible based on the parking state and the surroundings situation at the time of parking. Further, the sharing management server 10 can determine that the pick-up and delivery to the place of use is possible with restrictions when the parking state and the surroundings situation at the time of parking and the pick-up and delivery product satisfy predetermined conditions. As a result, with the sharing management server 10 according to the embodiment, it is possible to provide a technique for suppressing a situation in which pick-up and delivery to a parked vehicle is impossible in advance.

In addition, the sharing management server 10 can notify the requesting user of the result of the determination as to whether the pick-up and delivery is possible. The requesting user, for example, can browse the result of the determination as to whether the delivery is possible, which is notified via the requester terminal 40 at the time of ordering the purchased product or the time of requesting delivery of the pick-up product, and can select the place of use to which the pick-up and delivery is possible. With the trunk sharing system according to the embodiment, it is possible to improve convenience at the time of using the trunk sharing.

In addition, the sharing management server 10 can determine that the pick-up and delivery of the pick-up and delivery product is impossible based on the parking state and the surroundings situation after the vehicle is moved with respect to the place of use for which the reservation as the pick-up and delivery destination has been settled. The requesting user or a driver of the vehicle 30 can be notified of a result of the determination. With the trunk sharing system according to the embodiment, it is possible to suppress a situation in which the pick-up and delivery is impossible, which corresponds to a change in the parking state and the surroundings situation of the vehicle 30 after reservation for the pick-up and delivery destination is settled.

Further, when there is a request for confirmation of the surroundings situation of the vehicle 30 from the pick-up and delivery person terminal 50, the sharing management server 10 can acquire the surroundings situation of the vehicle 30 immediately before the pick-up and delivery, and determine that the pick-up and delivery of the pick-up and delivery product is impossible. With the trunk sharing system according to the embodiment, it is possible to suppress a situation in which the pick-up and delivery is impossible, which corresponds to a change in the parking state and the surroundings situation of the vehicle 30 immediately before the pick-up and delivery.

In addition, the sharing management server 10 can provide a result of the determination as to whether the pick-up and delivery is possible as determination information to the business server providing an electronic commerce service. With the trunk sharing system according to the embodiment, it is possible to provide determination information for suppression of a situation in which the pick-up and delivery to the parked vehicle is impossible to a home delivery company or a logistics company, and a company providing online shopping or the like.

4. Modification Forms

The embodiment is merely an example, and the present disclosure can be appropriately changed and carried out without departing from the gist of the present disclosure.

Modification Example 1

In the embodiment, the example in which the vehicle 30 is locked or unlocked by the locking and unlocking device 90 when the authentication process is successful in the key unit 80 has been described. In modification example 1, the process of the key unit 80 may be executed in the locking and unlocking device 90. That is, the locking and unlocking device 90 includes a control unit (ECU) for authenticating the authentication information received from the requester terminal 40 or the like. When the authentication of the requester terminal 40 or the like is successful, the control unit may transmit an unlocking command or a locking command to the body ECU 94 via the in-vehicle network such as a CAN. According to the trunk sharing system 1 of modification example 1, trunk sharing can be used with a simple configuration without installing the key unit 80.

Modification Example 2

In the embodiment, the requester terminal 40 or the like receives the key information issued by the key information management server 20, the locking and unlocking signal is transmitted from the key unit 80 to the locking and unlocking device 90 when the requester terminal 40 or the like is authenticated based on the authentication information of the received key information, and the vehicle 30 is locked or unlocked. Modification example 2 is an example in which the authentication information is not information for authenticating the requester terminal 40 or the like and includes information on a key ID for unlocking or locking the vehicle 30.

In this case, the requester terminal 40 or the like receives the key information including the key ID for locking or unlocking the vehicle 30 from the key information management server 20 or the like and transmits the received key ID to the locking and unlocking device 90 together with the locking and unlocking signal. The locking and unlocking device 90 collates the received key ID with the key ID stored in the locking and unlocking device 90 in advance, and locks or unlocks the vehicle 30 when the key IDs match. The key ID may be encrypted, transmitted, and received between the requester terminal 40 or the like, the key information management server 20 or the like, and the locking and unlocking device 90. For example, the key information management server 20 may generate the one-time key by encrypting the key ID together with the time information using a predetermined algorithm. The locking and unlocking device 90 may decrypt the received one-time key using the same predetermined algorithm as that of the key information management server 20 and collate the one-time key with the key ID stored in the locking and unlocking device 90 in advance. The one-time key may be transmitted from the key information management server 20 to the sharing management server 10 and may be transmitted from the sharing management server 10 to the requester terminal 40 or the like. In any case, the requester terminal 40 or the like may invalidate the one-time key by deleting the one-time key when a predetermined time has elapsed from receipt of the one-time key. According to the trunk sharing system 1 of modification example 1, the key information management server 20 or the like temporarily transmits effective key information to the requester terminal 40 or the like for each issuance request using the one-time key generated from the key ID and the time information as the key information.

Modification Example 3

In the embodiment and modification example 2, the key information management server 20 has transmitted the authentication information for the requester terminal 40 or the like corresponding to the authentication information specific to the key unit 80, or the key ID stored in the locking and unlocking device 90 of the vehicle 30 in advance. However, the authentication information between the requester terminal 40 or the like and the key unit 80 is not limited to the above information. In modification example 3, for example, the key information management server 20 may generate new authentication information and issue the new authentication information to the requester terminal 40 or the like each time the key information management server 20 receives a key information issuance request from the requester terminal 40 or the like. In this case, the key information management server 20 or the like may store the vehicle-side authentication information for the key unit 80 corresponding to the new authentication information in the key unit 80 via the communication device 32. The key unit 80 is connected to the communication device 32 through an in-vehicle network such as CAN. However, the key information management server 20 generates authentication information to be issued to the requester terminal 40 or the like, for example, using the identification information for identifying the vehicle 30 and the time information, and then, transmits the authentication information and the time information to the requester terminal 40 or the like. In this case, the key unit 80 of the vehicle 30 may generate the vehicle-side authentication information using the same algorithm as that for the key information management server 20. The requester terminal 40 or the like may transmit the authentication information and the time information issued as the key information to the key unit 80 and receive the authentication.

Others

In the trunk sharing system 1 according to the embodiment and each modification example, it is assumed that, for the locking or unlocking of the vehicle 30, unlocking or locking control of solely the package room door is performed in consideration of security, and unlocking or locking control of the vehicle cabin door is not performed and a locking state is maintained. Then, for example, in the vehicle 30 having a body structure in which the package room and the vehicle cabin are not separated from each other, that is, a type commonly referred to as a so-called one box, access to the vehicle cabin can be performed by unlocking the package room door, and therefore, an owner, a user, or the like of the vehicle 30 is likely to have security concern.

Therefore, in the vehicle 30 in which the package room and the vehicle cabin are not separated, when the package room door is opened, a drive recorder or the like capable of imaging the inside performs capturing of a video of the inside, and a determination is made whether or not there is intrusion into the vehicle cabin from the package room based on the captured video. For example, when the ECU controlling the drive recorder determines that there is intrusion into the vehicle cabin from the package room, the ECU performs storage of the captured video, operation of an in-vehicle alarm, notification to a company, notification to the vehicle user, and the like. On the other hand, when a determination is made that there is no intrusion into the vehicle cabin, the ECU may delete the captured image at a point in time at which the package room door is closed and locked. As a part of a user service, the drive recorder may transmit the captured video to the requester terminal 40 or the like that provides the vehicle 30 regardless of the presence or absence of intrusion into the vehicle cabin.

Computer-Readable Recording Medium

A program for causing an information processing device or other machine or device (hereinafter, a computer) to realize any one of the above functions can be recorded on a recording medium readable by a computer or the like. By causing a computer or the like to read and execute the program of the recording medium, the function thereof can be provided.

Here, the recording medium readable by the computer or the like refers to a recording medium capable of accumulating information such as data or programs according to an electrical, magnetic, optical, mechanical, or chemical action, which can be read from a computer or the like. Examples of a recording medium removable from the computer or the like among such recording media include a flexible disk, a magneto-optical disk, a CD-ROM, a CD-R/W, a DVD, a Blu-ray disk, a digital audio tape (DAT), an 8 mm tape, and a memory card such as a flash memory. Further, examples of a recording medium fixed to a computer or the like include a hard disk, a ROM, and the like.

What is claimed is:

1. An information system configured to manage use of one or more areas in a vehicle permitted to be used as a pick-up and delivery destination of a pick-up and delivery product, the information system comprising:
an information processing device including circuitry configured to:
obtain information indicating presence or absence of an obstacle around an opening and closing door corresponding to the pick-up and delivery destination,
determine whether or not there is space around the opening and closing door based upon the information indicating the presence or the absence of the obstacle including:
determining that there is space around the opening and closing door when the obstacle is present in a first range and is absent in a second range less than the first range, and
determining that there is not space around the opening and closing door when the obstacle is present in the second range or is present in a third range that is less than the second range,
acquire state information including information on a parking state of the vehicle, information on a surroundings situation of a parking position of the vehicle, and vehicle identification information of the vehicle, the information on the parking state of the vehicle including an orientation of the vehicle with respect to the parking position, the information on the surroundings situation of the parking position of the vehicle including whether or not there is space around the opening and closing door, and the vehicle identification information of the vehicle including an opening and closing type of the opening and closing door,
identify a restricted use area of the one or more areas in the vehicle in which delivery of the pick-up and delivery product is possible with restrictions according to the state information and delivery product information,
identify an unrestricted use area of the one or more areas in the vehicle in which delivery of the pick-up and delivery product is possible without restriction according to the state information and the delivery product information,
provide determination information for assisting in a determination as to whether or not pick-up and delivery of the pick-up and delivery product to the one or more areas is possible based on the state information to an external device that is provided external to the information processing device, including:
providing the restricted use area and the unrestricted use area to the external device,
receive a reservation for use of an area serving as the pick-up and delivery destination of the pick-up and delivery product in the one or more areas from a terminal of a user, and
determine that the pick-up and delivery of the pick-up and delivery product to the area serving as the pick-up and delivery destination is impossible based on the state information and package attribute information of the pick-up and delivery product after reception of the reservation for use,
wherein the information indicating the presence or the absence of the obstacle around the opening and closing door is obtained from a sensor of the vehicle.

2. The information system according to claim 1, wherein the circuitry is configured to:
acquire the package attribute information of the pick-up and delivery product; and provide the determination information to the external device based on the state information and the package attribute information of the pick-up and delivery product.

3. The information system according to claim 1, wherein the circuitry is configured to:
receive a condition for specifying the pick-up and delivery destination from the terminal of the user who uses the vehicle as the pick-up and delivery destination of the pick-up and delivery product; and
provide the determination information for the vehicle that satisfies the condition to the external device.

4. The information system according to claim 1, wherein the circuitry is configured to:
receive a request for acquisition of the state information from the terminal; and
determine that the pick-up and delivery of the pick-up and delivery product to the area serving as the pick-up and delivery destination is impossible based on the state information acquired in response to the request for acquisition and package attribute information of the pick-up and delivery product the use of which has been reserved.

5. The information system according to claim 1, wherein the circuitry is configured to provide the determination information to a business server that provides an electronic commerce service.

6. The information system according to claim 1, wherein the orientation of the vehicle with respect to the parking position includes one from among a forward direction and a rearward direction.

7. An information system configured to manage use of one or more areas in a vehicle permitted to be used as a pick-up and delivery destination of a pick-up and delivery product, the information system comprising:
an information processing device including circuitry configured to:
obtain information indicating presence or absence of an obstacle around an opening and closing door corresponding to the pick-up and delivery destination,
determine whether or not there is space around the opening and closing door based upon the information indicating the presence or the absence of the obstacle including:
determining that there is space around the opening and closing door when the obstacle is present in a first range and is absent in a second range less than the first range, and
determining that there is not space around the opening and closing door when the obstacle is present in the second range or is present in a third range that is less than the second range,
acquire state information including information on a parking state of the vehicle, information on a surroundings situation of a parking position of the vehicle, and vehicle identification information of the vehicle, the information on the parking state of the vehicle including an orientation of the vehicle with respect to the parking position, the information on the surroundings situation of the parking position of the vehicle including whether or not there is space around the opening and closing door, and the vehicle identification information of the vehicle including an opening and closing type of the opening and closing door,
identify a restricted use area of the one or more areas in the vehicle in which delivery of the pick-up and delivery product is possible with restrictions according to the state information and delivery product information,
identify an unrestricted use area of the one or more areas in the vehicle in which delivery of the pick-up and delivery product is possible without restriction according to the state information and the delivery product information,
provide determination information for assisting in a determination as to whether or not pick-up and delivery of the pick-up and delivery product to the one or more areas is possible based on the state information to an external device that is provided external to the information processing device, including:
providing the restricted use area and the unrestricted use area to the external device,
receive a reservation for use of an area serving as the pick-up and delivery destination of the pick-up and delivery product in the one or more areas from a terminal of a user, and
determine that the pick-up and delivery of the pick-up and delivery product to the area serving as the pick-up and delivery destination is impossible based on the state information and package attribute information of the pick-up and delivery product after reception of the reservation for use,
wherein the orientation of the vehicle with respect to the parking position is determined based upon a shift lever positon of the vehicle immediately before a parking position of the shift lever is reached.

8. The information system according to claim 1, wherein the circuitry is configured to issue an electronic key usable to lock or unlock the one or more areas in the vehicle.

9. The information system according to claim 7, wherein the circuitry is configured to:
acquire the package attribute information of the pick-up and delivery product; and
provide the determination information to the external device based on the state information and the package attribute information of the pick-up and delivery product.

10. The information system according to claim 7, wherein the circuitry is configured to:
receive a condition for specifying the pick-up and delivery destination from the terminal of the user who uses the vehicle as the pick-up and delivery destination of the pick-up and delivery product; and
provide the determination information for the vehicle that satisfies the condition to the external device.

11. The information system according to claim 7, wherein the circuitry is configured to:
receive a request for acquisition of the state information from the terminal; and
determine that the pick-up and delivery of the pick-up and delivery product to the area serving as the pick-up and delivery destination is impossible based on the state information acquired in response to the request for acquisition and package attribute information of the pick-up and delivery product the use of which has been reserved.

12. The information system according to claim 7, wherein the circuitry is configured to provide the determination information to a business server that provides an electronic commerce service.

13. The information system according to claim 7, wherein the orientation of the vehicle with respect to the parking position includes one from among a forward direction and a rearward direction.

14. The information system according to claim 7, wherein the circuitry is configured to issue an electronic key usable to lock or unlock the one or more areas in the vehicle.

* * * * *